United States Patent [19]
Robrock, II

[11] Patent Number: 5,539,884
[45] Date of Patent: Jul. 23, 1996

[54] INTELLIGENT BROADBAND COMMUNICATION SYSTEM AND METHOD EMPLOYING FAST-PACKET SWITCHES

[75] Inventor: Richard B. Robrock, II, Bedminster, N.J.

[73] Assignee: Bell Communications Research, Inc., Morristown, N.J.

[21] Appl. No.: 69,243

[22] Filed: May 28, 1993

Related U.S. Application Data

[63] Continuation-in-part of Ser. No. 63,661, May 20, 1993, abandoned.

[51] Int. Cl.⁶ .................................................. G06F 13/00
[52] U.S. Cl. .................... 395/200.12; 370/60; 379/13; 379/112; 379/165; 364/238.2; 364/242.94; 364/DIG. 1
[58] Field of Search ................................ 395/800, 275, 395/250, 200, 200.12, 200.13, 825; 379/15–18, 46, 93, 94, 112, 118, 120, 164, 165, 182, 183, 220, 221, 245, 248, 271–274; 371/8.1, 8.2, 9.1, 11.2, 11.3, 68.1–68.3; 370/54, 60, 60.1, 67, 68.1, 91, 94.1; 340/825.03, 826, 827

[56] References Cited

U.S. PATENT DOCUMENTS

| | | | |
|---|---|---|---|
| 4,580,259 | 4/1986 | Harada et al. | 370/58 |
| 5,042,062 | 8/1991 | Lee et al. | 379/54 |
| 5,115,426 | 5/1992 | Spanke | 370/60 |
| 5,115,427 | 5/1992 | Johnson, Jr. et al. | 370/60 |
| 5,140,585 | 8/1992 | Tomikawa | 370/60.1 |
| 5,239,537 | 8/1993 | Sakauchi | 370/16 |
| 5,351,234 | 9/1994 | Beierle et al. | 370/49.5 |

*Primary Examiner*—Alyssa H. Bowler
*Assistant Examiner*—Alpesh M. Shah
*Attorney, Agent, or Firm*—Leonard Charles Suchyta; Joseph Giordano

[57] ABSTRACT

A broadband intelligent network (50) an ATM switch or other fast-packet switch (51) in a fiber optic, fast-packet communication system. The ATM switch (51) is directly coupled (53) through one of its ports to a network service control point (61) for the implementation of requested services without the use of an intermediate common channel signaling system. ATM cells, identified as signaling cells, carry customer service requests and are automatically routed through the ATM switch to the network service control point (61). The service control point (61) determines the requested service and executes a corresponding programmed procedure (210). Connection service requested by a particular signaling cell is implemented by the service control point (61) sending a command cell through a port of the ATM switch (51) to instruct the switch connection management processor (64) to establish a switched virtual circuit for the requested connection.

50 Claims, 15 Drawing Sheets

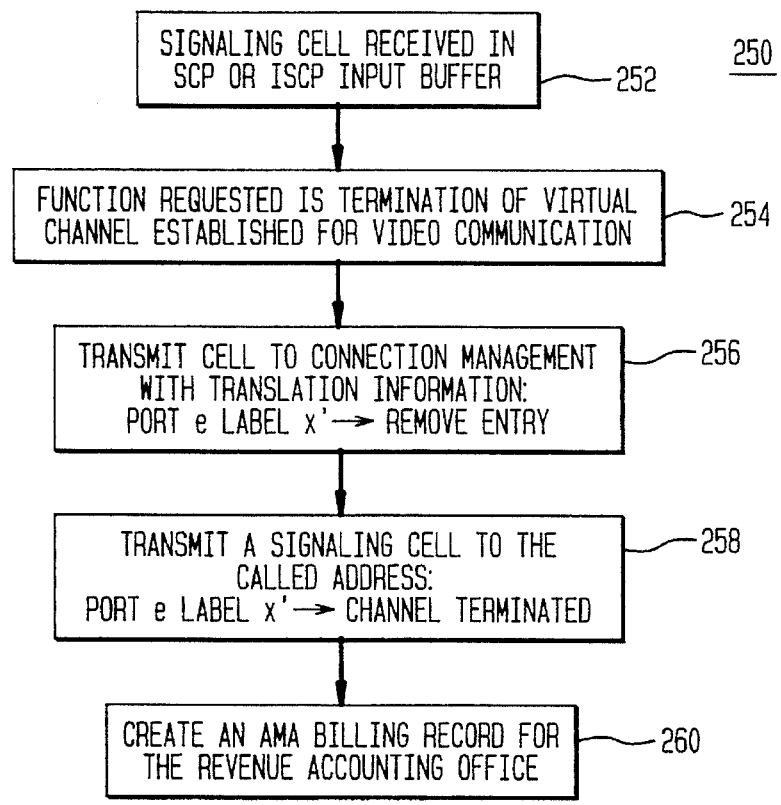
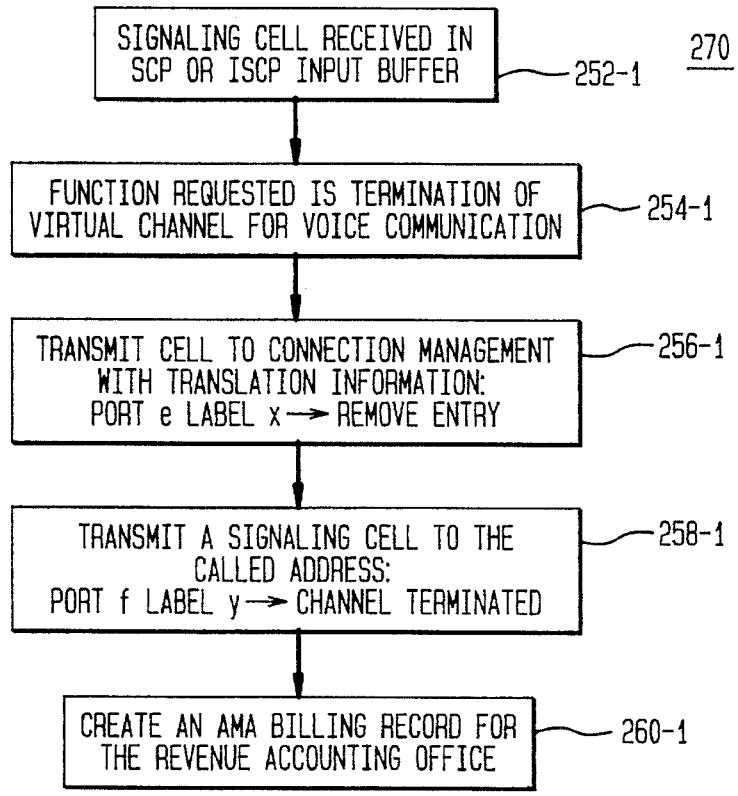

INTELLIGENT BROADBAND COMMUNICATION SYSTEM AND METHOD EMPLOYING FAST-PACKET SWITCHES

This application is a continuation-in-part application of a patent application filed May 20, 1993, entitled "Intelligent Broadband Communication System and Method," for Richard B. Robrock, bearing Ser. No. 08/063,661, now abandoned, and Attorney Docket No. 01333.0032, which is hereby incorporated by reference.

BACKGROUND OF THE INVENTION

The present invention relates to communication networks. More particularly, the present invention relates to broadband communication networks having intelligent network control.

Human beings provided the first "intelligence" in the United States telephone network. Rows of human telephone operators, sitting side by side, plugged cords into jacks to handle calls. The operators established calls to distant locations, selected the best routes, and provided billing information. In the 1920s, sophisticated electromechanical switching systems were introduced which allowed automatic switching of telephone calls. Initially, these switching systems served as aids to operators. Ultimately, however, they led to the replacement of operators.

Another significant change to the United States telephone network took place in the mid 1960s, with the implementation of the first stored-program control switch. Switching software in the stored-program control switch enabled a family of custom calling services, e.g., speed calling, call waiting, call forwarding, and three-way calling and a set of Centrex features, e.g., station attendant, call transfer, abbreviated dialing, etc. The first programs for the stored-program control switches contained approximately 100,000 lines of code. By 1990, however, some of the switching systems became enormously complex, containing 10 million lines of code and offering hundreds of different services to telephone users. Because there are over 15,000 switches in the United States telephone network and many different switch types, it is difficult to introduce new services with ubiquity and with service uniformity. For example, it required over twenty years to introduce custom calling services throughout the United States and those services behave differently in different switch types.

In the 1980s, industry applied a new architectural concept to the public switched telephone network (PSTN) to create an Intelligent Network (IN) with which new services could be rapidly deployed with ubiquity and with service uniformity. The availability of features and services in the IN is not dependent solely upon the hardware and software in stored-program control switches. Instead, intelligence is provided in a central data base and accessed using packet switching techniques.

The basic elements of the IN architecture are a switching system, a common channel signaling network, a central data base, and an operations support system. When a customer places a telephone call that requires special handling, such as a toll-free call (800 service) or a credit card call, the call is routed to a service switching point (SSP), which launches a query through a common channel signaling network (CCSN) to a central data base. The central data base, in turn, retrieves information necessary to handle the call and returns that information through the CCSN to the switch. The switch uses the information to complete the call. The central data base is supported by an operations support system, which administers the appropriate network and customer information residing in the data base.

SSPs are stored-program control switches, which interface with the CCSN using the SS7 protocol and 56 kb/s links. SSPs contain the service logic required to intercept calls that require special handling and send queries through the CCSN to centralized data bases to obtain the required call handling information.

The IN also includes the CCSN, which is made up of signal transfer points (STPs). STPs are high-capacity and reliable packet switches for transporting messages between network nodes, such as switches and service control points (SCPs). STPs are typically deployed in pairs with the two members of the pair distant from each other so that a natural disaster at the site of one STP will likely not affect the STP at the other site. STPs also terminate a large number of signaling links, perform protocol processing, and route a high volume of messages through their links. To perform these functions, they require a large routing data base containing translation data.

SCPs, which are also usually paired, provide on-line call handling information in response to network queries. They operate in real-time, with typical response times of less than half a second and have a high availability, with typical down-times of less than three minutes-per-year for an SCP pair.

As explained in more detail below, SCPs contain a set of front-end processors used to perform portions of the SS7 protocol processing, such as the message transfer part (MTP) and the signaling connection control part (SCCP). Using a dual-Ethernet configuration, the front-end processors communicate with a collection of central processing units (CPUs) in the back end. The back-end CPUs process an SS7 application layer protocol called the transaction capabilities application part (TCAP), and essentially perform query processing.

SCPs interface with STPs using a plurality of 56 kb/s SS7 links. They also interface with operations support systems using duplicated 9.6 kb/s X.25links.

For more information on the SCP, reference is made to U.S. Pat. No. 5,084,816, entitled "Real Time Fault Tolerant Transaction Processing System," the contents of which is incorporated by reference.

Finally, the IN includes service management systems (SMSs). An SMS is an interactive operations support system, which processes and updates customer records. It provides an interface between the customer and the centralized data bases in the IN.

FIG. 1A illustrates a circuit-switched intelligent network (IN) 122. The IN 122 includes a LATA 124, a common channel signaling network 136, an SCP 134, and an SMS 135.

The LATA 124 includes a service switching point (SSP) 126 and a plurality of local exchange switches 128 (only one shown). Telephone lines 130 (only one shown) connect customers to the local switches 128. A plurality of interexchange carrier links 132 connect the LATA 124 to other LATAs (not shown). As described above, network services are controlled by the SCP 134, which is supported by an SMS 135. CCSN 136 interfaces the SCP 134 to the SSP 126.

Generally, requests for network services are generated by the SSP 126 when certain events occur while processing a call, e.g. the SSP 126 may launch a query to the SCP 134 when a customer goes off hook or after the customer completes dialing. To handle the queries and responses, the CCSN 136 uses the SS7 protocol which supports TCAP messages between the SSPs and the SCPs. Data links operating at 56 Kb/s are used throughout the signaling network and query response times as seen by the SSP are typically one-half second or more. Unfortunately, the CCSN 136 handles service-related queries and responses at a data transfer rate that is considered unacceptably slow for broadband networks, and does not interface with fast-packet switches.

The Advanced Intelligent Network (AIN) is similar to the IN, as shown for example in FIG. 1B. AIN introduces a service creation capability that allows rapid development of new services and customization of services. It also broadens the participation in service creation in that telephone company personnel as well as their customers can create new services. In the AIN 138 of FIG. 1B, the SPACE™ service creation system 146 interfaces with the ISCP 144. The ISCP 144 is interfaced to STPs 140 and 142, which are part of the CCSN. STPs 140 and 142 are connected to an SSP 147 in the circuit-switched network. The SPACE system provides the capability for automatically programming the ISCP to execute new network services.

The IN and AIN support a variety of existing telephone voice services, one example being alternate billing services (ABSs). ABSs include a calling card service, collect call service, and bill-to-third number service. In accordance with the ABS architecture, a call is routed to an operator services system (OSS), which launches a query through an SS7 CCSN to an SCP. The SCP provides routing information, such as the identity of the customer-specified carrier that is to handle the call, as well as screening functions, such as validating a calling card. The SCP returns the appropriate information to the inquiring OSS, which completes the call.

Another example of an existing voice service is an 800 toll-free calling service. This service enables a subscriber to use a single 800 number with different carriers. 800 number calls are routed to an SSP, which launches queries through an SS7 CCSN to an SCP. The SCP identifies the appropriate carrier, as specified by the 800 service subscriber, and, if appropriate, translates the 800 directory number to a plain old telephone service (POTS) number. The SCP returns this information to the SSP, which hands the call off to the appropriate carrier. This technology allows customers to select the carrier and the POTS directory number as a function of criteria such as time-of-day, day-of-week, percent allocation, and location of the calling station.

With the use of special software, SCPs can also give the PSTN the characteristics of a private virtual network (PVN). With the IN architecture that supports PVN, the SCP data base can provide screening, routing, and billing functions. A PVN serves a closed user group, and a caller requires authorization to get on the network. Thus, the PVN screens calls for those that can access the network based on the directory number of the calling party or based on an authorization code. The validation or authorization function is similar to that implemented for ABSs when calling cards are validated. The PVN also offers an abbreviated dialing plan. In this case, the SCP translates an address and converts an abbreviated set of digits, e.g., four digits, seven digits, etc., to a 10-digit POTS number. This is analogous to the 800-to-POTS translation associated with 800 service. The PVN may also provide additional customer-specified routing functions, which involve selections from a hierarchy of facilities, such that when all circuits in one facility are busy, traffic is routed over an alternate facility. Finally, the PVN may perform a billing function when different charges exist, depending upon the facilities it uses for routing.

The IN and AIN can also support some data services. For example, a customer may connect a data terminal or computer to the network and communicate with another data terminal or computer. To support these services, the front-end of an SCP is enhanced, allowing it to communicate with a data signaling network, such as the X.25 network. With this enhancement, many of the services traditionally associated with voice customers, such as 800 service, ABS, or PVN Service, can be deployed for data customers. For example, an ABS for data customers allows data calls to be placed using the same calling card and calling card number used for voice calls. In this instance, the SCP accepts X.25 queries from a packet switch that functions relatively slowly in a public packet-switched network (PPSN), instead of SS7 queries from an operator services system in a circuit-switched network.

While the IN and AIN can be used to meet some voice and data needs of customers, they cannot meet customer's needs for broadband video and data services because the underlying circuit-switched network is limited by its bandwidth and signaling speeds.

Fast-packet switching technology is being developed for broadband networks with voice, high-speed data, and video transmission capabilities. However, these networks are quite limited and lack the intelligence and flexibility to support many services. Evolving architectures for broadband networks employ fast-packet switches interconnected through fiber-optic facilities. The fast-packet switches make permanent or "nailed up" virtual connections for subscriber calls. Although these permanent virtual connections have application, for example, in limited private networks, such connections have little use in intelligent telecommunication networks because they are inflexible.

In sum, fast-packet switches lack embedded intelligence for practical network-based services. Also, intelligent network controls, which exist in today's circuit-switched networks, for example, the IN and AIN, which employ relatively slow common channel signaling systems, are not satisfactory for fast-packet switches.

Disclosure of the Invention

Accordingly, a principal advantage of the present invention is the provision of a broadband intelligent telecommunication network (BIN) which substantially obviates one or more of the limitations of conventional telecommunication networks.

Another advantage of the present invention is the provision of the BIN and a method for employing intelligent network control to provide customer services in a broadband fast-packet network.

The present invention provides a significant advance in the telecommunications art. The IN infrastructure is applied to a fast-packet network to produce a broadband intelligent network in which substantial added value is provided through the simultaneous handling of voice, data, and video communications with network controlled services. The realizable added value is much greater than the added value realized with the prior application of intelligent network controlled services to circuit-switched networks.

Intelligent network service control is provided for broadband networks with relative simplicity and with openness. Further, broadband network service control is provided at a very fast rate, more than 100 times faster than the rate at which network service control is provided in circuit-switched networks.

The broadband IN control provides basic control functions that may be employed in implementing a wide variety of network services in a broadband telecommunications network. These basic functions include call authorization (calling party, called party, billing party), address translation and carrier identification. In addition to providing basic and other network service control functions, the invention greatly facilitates the processing of data for customer billing purposes.

As a result of the structure and operation of the invention, intelligent network controlled services can be made available widely, rapidly, uniformly, and economically in broadband or fast-packet networks. Further, broadband network level services can be implemented to complement present and future intelligence implemented in customer premises equipment.

To achieve the advantages and objects of the invention, and in accordance with the purposes of the invention as embodied and broadly described herein, the present invention provides a broadband intelligent network including means for routing packets (cells) through multi-ported, fast-packet switches. First processing means are provided for managing virtual connections between switch ports by processing data extracted from cells in order to route the cells. Means are provided to establish switched virtual connections within a few milliseconds that result in cell routing in accordance with connection data contained in a signaling cell for each connection request. Certain means couple customer apparatus through broadband digital facilities to predetermined switch ports to transport cells to and from the customer apparatus.

Second means are also provided to process customer service request data extracted from received signaling cells and to control network responses thereto, including carrier identification, address translation, calling and called party authorizations and billing authorizations. Means are provided for interfacing the second processing means to at least one of the switch ports. The first processing means detects each signaling cell received by the fast-packet switching means and routes each signaling cell to the second processing means through the one switch port. The second processing means detects service request data in each received signaling cell and generates at least one output command to implement the requested service and generates a signaling cell routed to the calling or called party.

Means are also provided to use the second processing means to produce a complete billing record for all customer services provided by the broadband intelligent network.

Additional advantages and objects of the invention will be set forth in the description which follows, and in part will be apparent from the description, or may be learned by practice of the invention. The advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a preferred embodiment of the invention and, together with the description, provide an explanation of the objects, advantages, and principles of the invention. In the drawings:

FIG. 1A is a block diagram of a conventional circuit-switched IN;

FIGS. 7A–7D are flow diagrams illustrating procedures executed by an SCP or an ISCP in the networks of FIGS. 2A and 2B, in accordance with one embodiment of the present invention;

Best Mode for Carrying Out the Invention

Figure 2A:
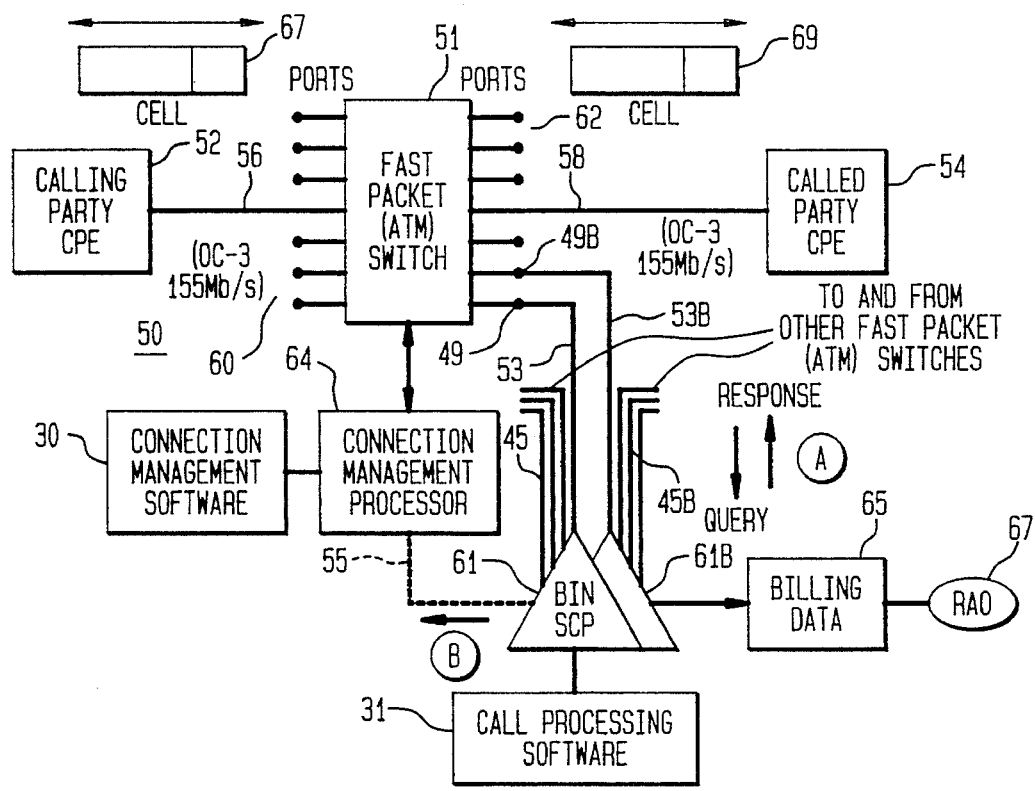
FIG. 2A; shows a system block diagram for a first preferred embodiment of a broadband intelligent telecommunications network in accordance with the invention.

In FIG. 2A, the broadband intelligent network (BIN) 50 of the invention is based on fast-packet technology. As used herein, fast-packet network means a network that transports digital data in packets at high transport rates (typically megabits per second) with sub-millisecond switch delays and without retransmission of erroneous packets.

BIN 50 preferably includes a fast-packet switch 51, a connection management processor 64, a BIN SCP 61, and a regional accounting office (RAO) 67.

The fast-packet switch 51 has a plurality of two-way ports 60 and 62, each of which may be provided with fiber optic links 56 and 58, respectively, to subscribers. A fiber optic link or connection means a connection established wholly or partly using fiber optic facilities. Each fiber optic link 56 or 58 can provide connections for multiple subscribers. For example, a connection from a fast-packet switch 51 to a customer may use fiber optics to a point of multiplexer distribution and from that point to the customer location the connection may use coaxial cable. In addition to connecting to subscribers, one or more of ports 60, 62 may also be connected through links (not shown), preferably fiber optic, to one or more other fast-packet switches (not shown) in the BIN 50. The use of fiber optic connections is preferred since fiber optic facilities provide extremely high data rate transport capabilities. Other types of connection facilities usable in the BIN 50 include coaxial cable and satellite links.

Figure 2B:
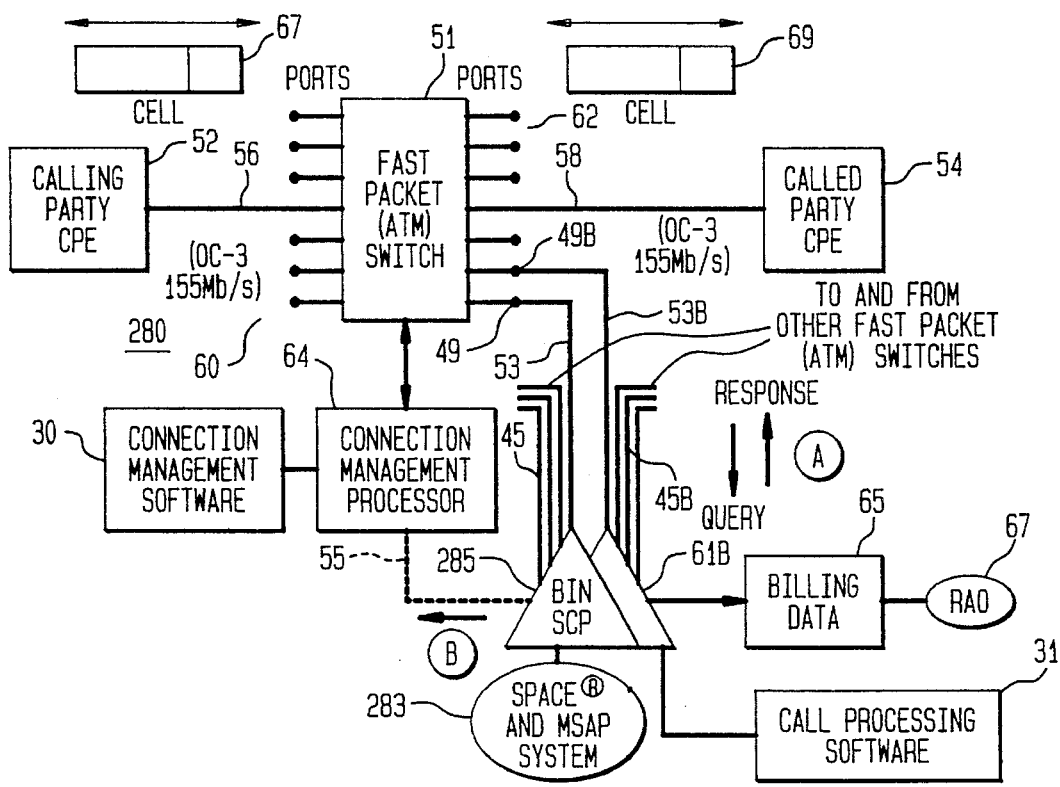
FIG. 2B shows a system block diagram for a second preferred embodiment of a broadband intelligent telecommunications network arranged in accordance with the invention to implement rapid programming of network services.
Figure 2C:
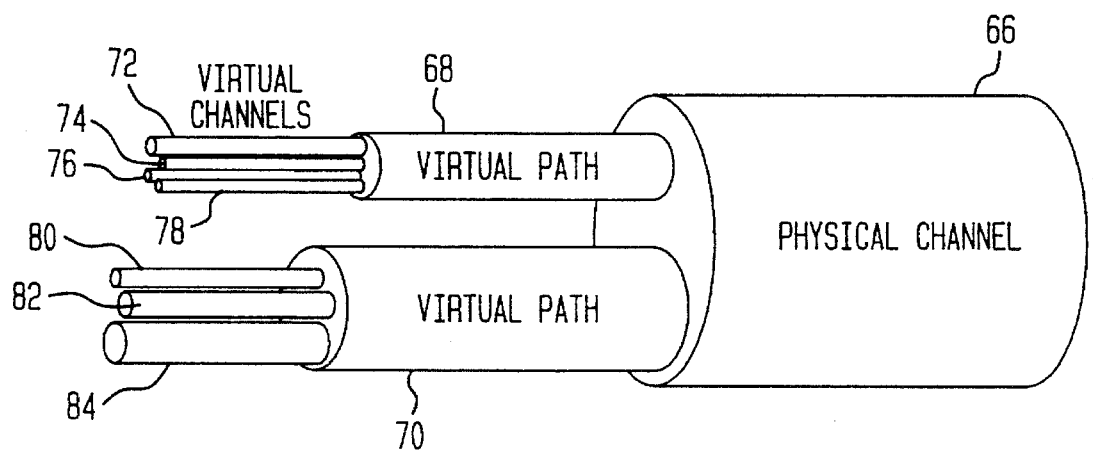
FIG. 2C shows a section of an ATM physical channel and illustrates schematically the manner in which multiple virtual channels can be established in a physical channel.

As illustrated in FIG. 2C, a fiber optic connector comprises a physical channel 66 within which multiple virtual paths, such as paths 68 and 70, may be formed. In turn, each virtual path may include multiple virtual channels, as illustrated by virtual channels 72, 74, 76, and 78 for the virtual path 68 and virtual channels 80, 82, and 84 for the virtual path 70. A virtual channel is a path between two communicating ATM entities that is identified by a label rather than a fixed physical path. A virtual path (FIG. 2C), on the other hand, is a group of virtual channels that travel between common points. Virtual path connections contain bundles of virtual channels that are switched together as a unit. Virtual channels are established by two methods. Channels established by provisioning are called permanent virtual channels (PVCs) and are analogous to circuits nailed up through a switch. Channels established for short duration using signaling and network switching are termed switched virtual channels (SVCs). Provisioned or permanent virtual channels are usually established for long term use (months, years) between two end points. Once a permanent virtual channel is established, no further network intervention is required to transfer user information between these two points.

The fast-packet (FP) switch 51 can be embodied in various forms. For example, current state-of-the-art FP switches include asynchronous transfer mode (ATM) switches, SMDS switches, and frame relay switches. In a preferred embodiment, the present invention uses an ATM switch in the BIN 50. An ATM switch is a connection-oriented switch, which employs virtual connections and operates with fixed length data packets (cells). ATM switches can handle signals with transport rates of 155 Mb/s or greater and they introduce only sub-millisecond delays in transit time and in delay variability. The maximum expected delay through an ATM switch is 150 microseconds.

Figure 3:
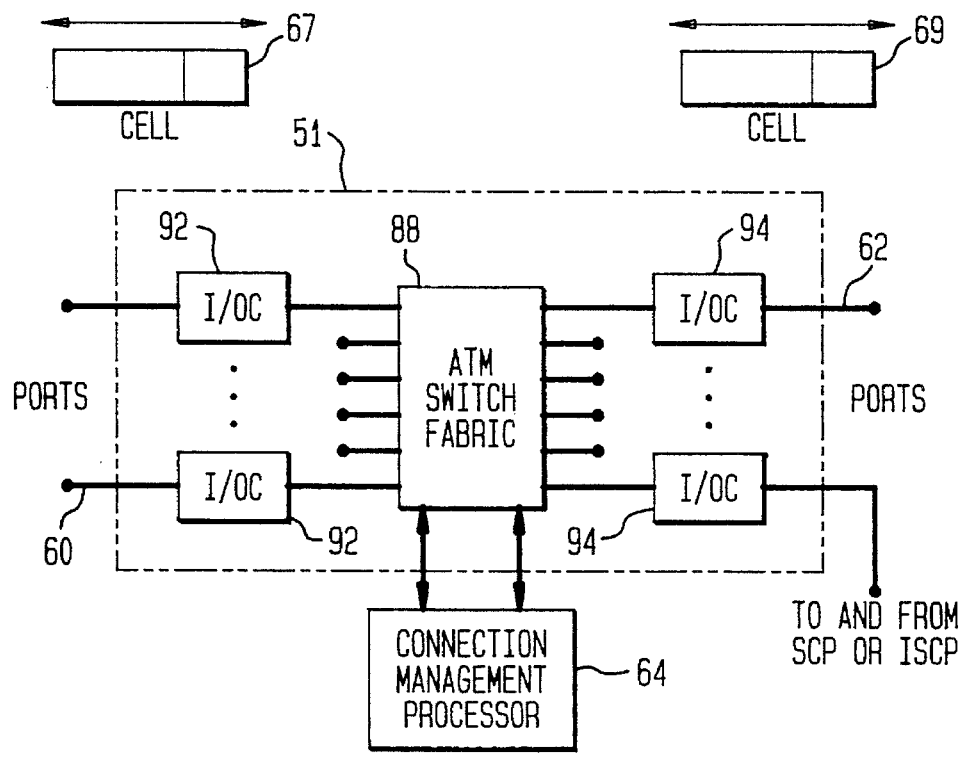
FIG. 3 is a more detailed block diagram of an ATM switch that is preferably employed as a fast-packet switch in the networks of FIGS. 2A and 2B.

An ATM switch 51 is shown, for example, in greater detail in FIG. 3. The ATM switch 51 has a switch fabric 88, which can provide a virtual connection between any two ports. The connection management processor 64 establishes and releases virtual connections and maintains the ATM switch. Input and output controllers 92 or 94 are provided for each port to provide data buffering and to provide optical-electrical and electrical-optical conversion, respectively. The numbers of ports for an ATM switch may range from a low number such as 16 to as many as 1,000 or more. ATM switches are capable of handling the very high bit rates associated with broadband data and full-motion video. The high speed bit streams are packaged into 53-byte cells and can be multiplexed together to be carried on a single medium.

Figure 4A:
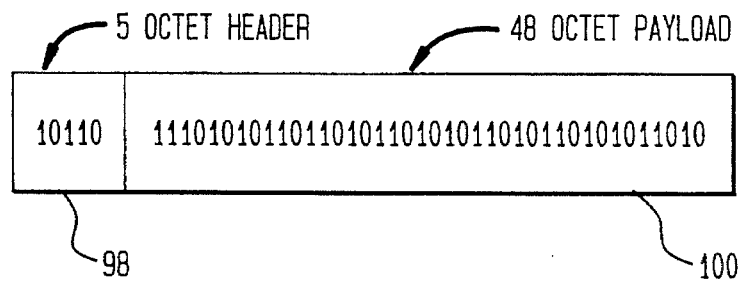
FIG. 4A is a graphical representation of the structure of an ATM data cell employed in the networks of FIGS. 2A and 2B, in accordance with one embodiment of the present invention.

The asynchronous transfer mode used in ATM switches is a CCITT standard for packaging, multiplexing, and switching end user digital information in fixed length data packets (cells), 53 bytes (octets) in length. FIG. 4A illustrates the international standard structure of a 53 byte ATM data cell 96. The data cell 96 includes a header 98, to which 5 bytes are assigned, and a payload portion 100, to which 48 bytes are assigned. ATM is a connection-oriented form of packet data communications. That is, packets or cells are transmitted over a virtual channel that is formally established and terminated.

ATM supports cell relay services, whereby cells carrying user information are routed through an ATM network based on information contained in cell headers. The routing information is provided as a label, not an explicit user address.

Figure 4B:
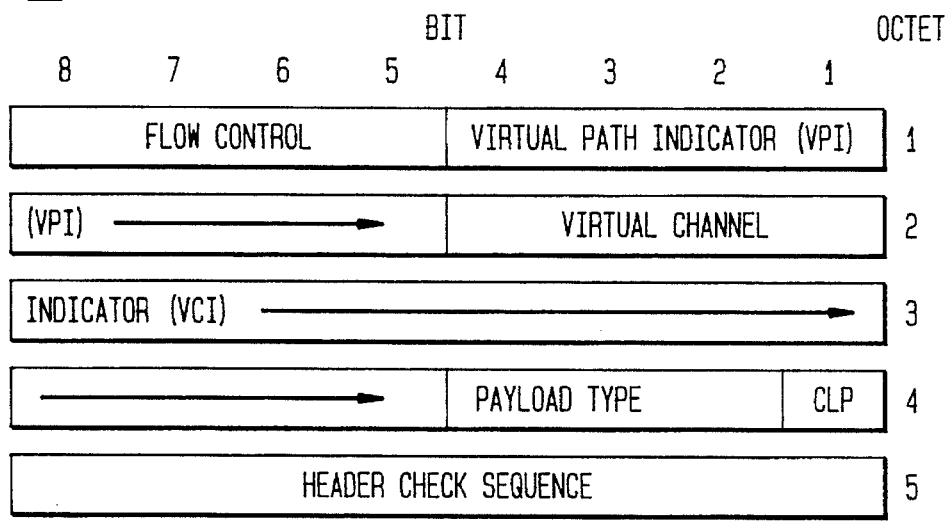
FIGS. 4B and 4C show data cells as they appear respectively at a user network interface (UNI) and at a network node interface (NNI) of the networks of FIGS. 2A and 2B, in accordance with one embodiment of the present invention.

FIG. 4B illustrates an ATM cell header as it appears in a cell 87 at a user network interface (UNI). As shown, the ATM cell header includes the following information:

| Flow Control | 4 bits |
|---|---|
| Virtual Path Indicator (VPI) | 8 bits |
| Virtual Channel Indicator (VCI) | 16 bits |
| Payload Type | 3 bits |
| Cell Loss Priority | 1 bit |
| Header Check Sequence | 8 bits |

VPI and VCI and other terms are defined in Appendix A. The flow control bits control ATM traffic flow for multiple applications. VPI and VCI together make up the ATM address or label. The payload type indicates the type of information carried by the cell, e.g., user data or management information. At this time, 0–3 are for user data, 4 and 5 are for management information, and 6 and 7 are reserved. The header check bits are used to correct single bit errors in the header or to detect multiple errors.

The cell header normally contains both a VPI and a VCI enabling the cell to have a unique VC identifier and be associated with a particular VPI in common with other VCs having the same VPI. VPs bundle traffic heading to the same destination. VPIs and VCIs are used to establish permanent or on-demand virtual connections. These connections are termed virtual because they exist in the physical sense only for as long as the message traverses the ATM switch.

Figure 4C:
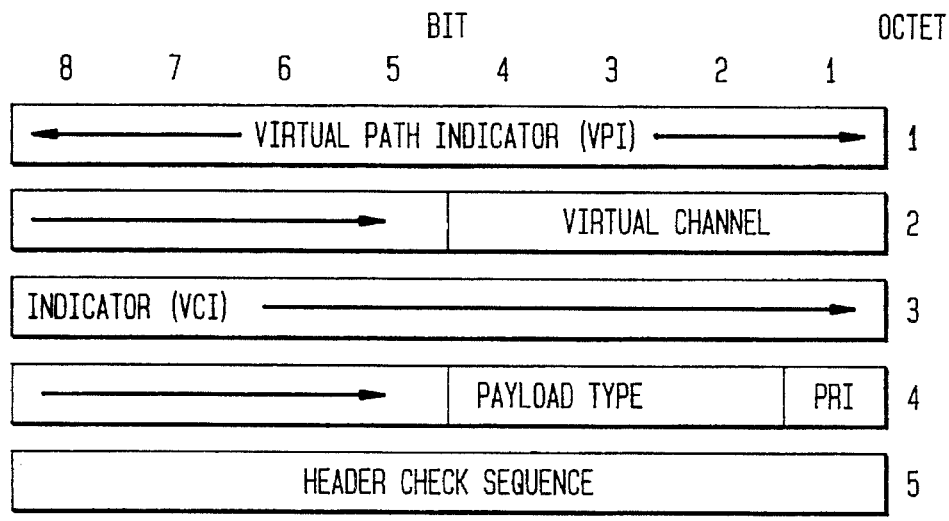

As shown in FIG. 4C, an ATM cell header in a cell 89 at a Network Node Interface (NNI) is similar to the ATM cell header at a UNI, except that it has no flow control bits and the VPI expands to 12 bits.

Using cell addressing, ATM switches separate the traffic from the physical channel and allow many users to share the transport medium. Consecutive cells of independent users may flow through the same path into the same port. Thus, the communication channel connections are virtual rather than physical since they are determined by input and output addresses and lookup tables.

At OC-3 rates (155 Mb/s), a 53-byte cell may be available for routing to its destination address for about three microseconds and the cell right behind it on the same input port may be addressed somewhere else. A call set-up process that depends on preestablishing a physical path through a switch fabric will be ineffective in this environment. ATM switches thus use self-routing procedures to route cells through the switch fabric on the basis of cell data.

The self-routing ATM switch uses the incoming cell's VPI/VCI to establish the proper output port to which the cell should be routed based on lookup tables. The switch then attaches a routing header or tag to the cells, and overwrites the VPI/VCI fields with new values for subsequent use. The cell and its routing tag are then passed through the switch fabric, which provides a series of routing actions based on the tag. The tag represents the destination output port for the cell, and the fabric routes the cell in real time based on the tag.

The ATM cell header labels (VPI/VCI) allow cells to be routed by using lookup tables called translation tables. The translation tables tie an input cell from a particular input port with a particular label, to a specified output port with a different label.

Figure 6A:
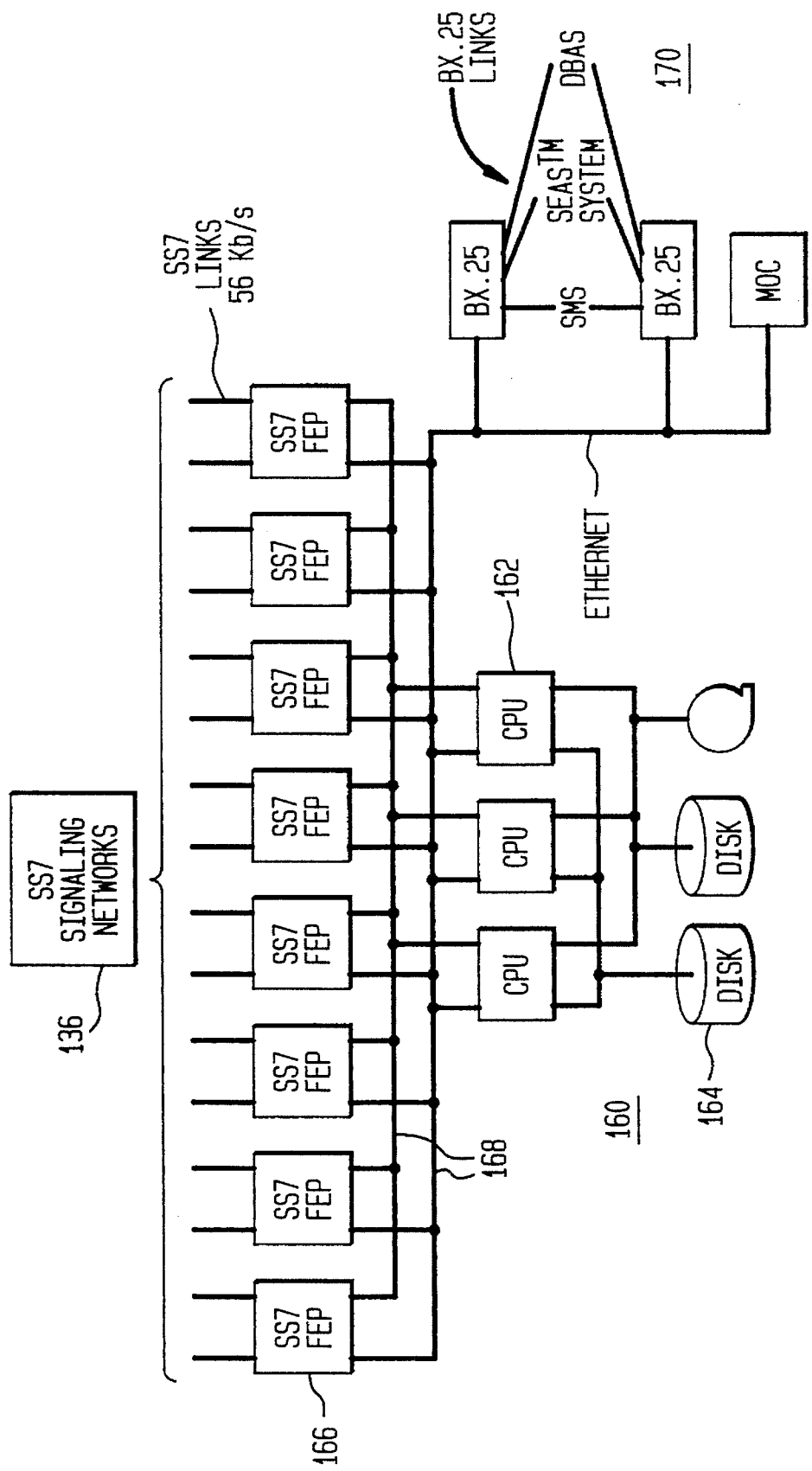
FIG. 6A is a block diagram of an SCP employed in the circuit-switched IN of FIG. 1A.
Figure 6B:
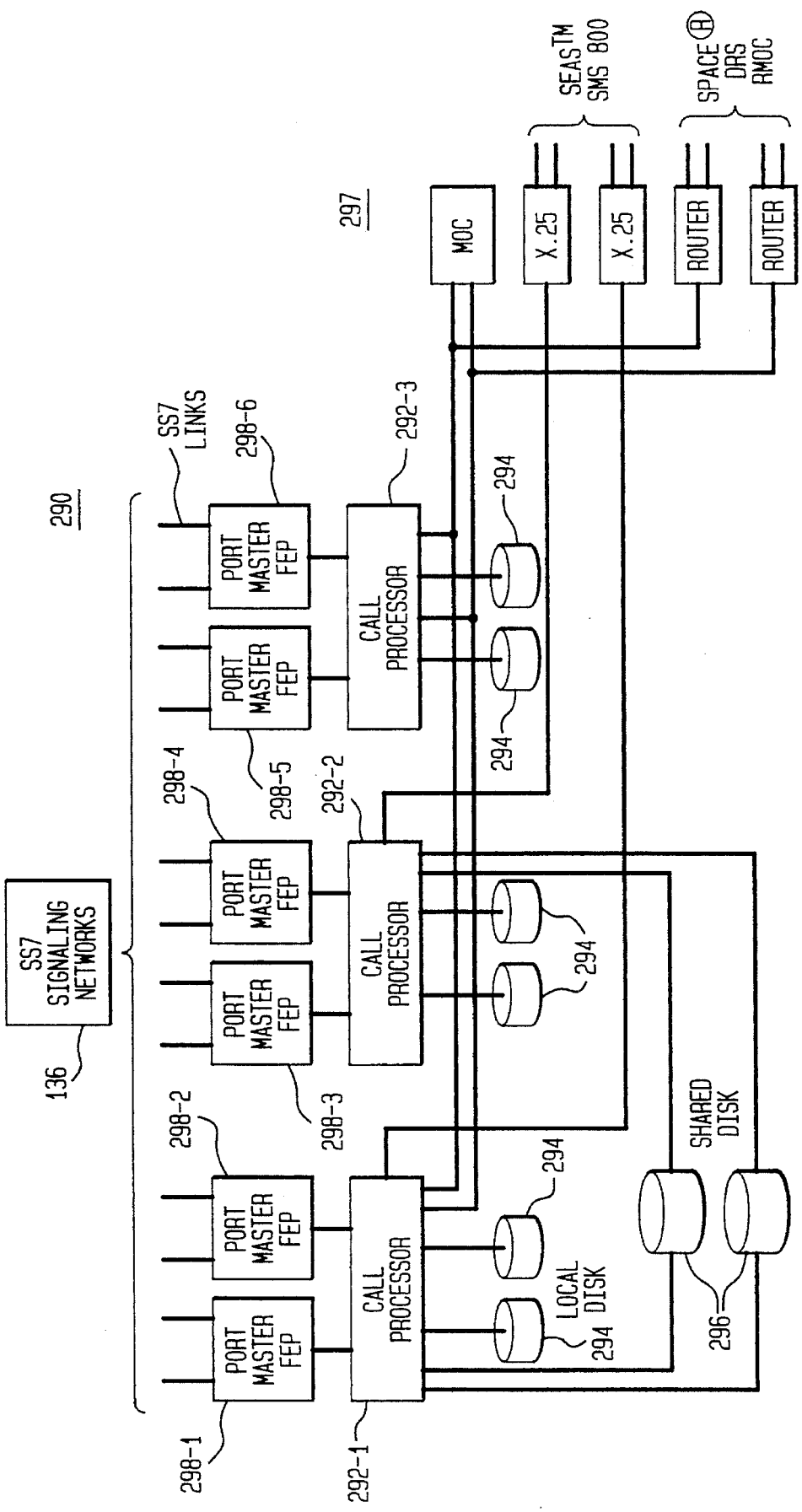
FIG. 6B is a block diagram of an integrated service control point (ISCP) employed in the circuit-switched AIN of FIG. 1B.
Figure 6C:
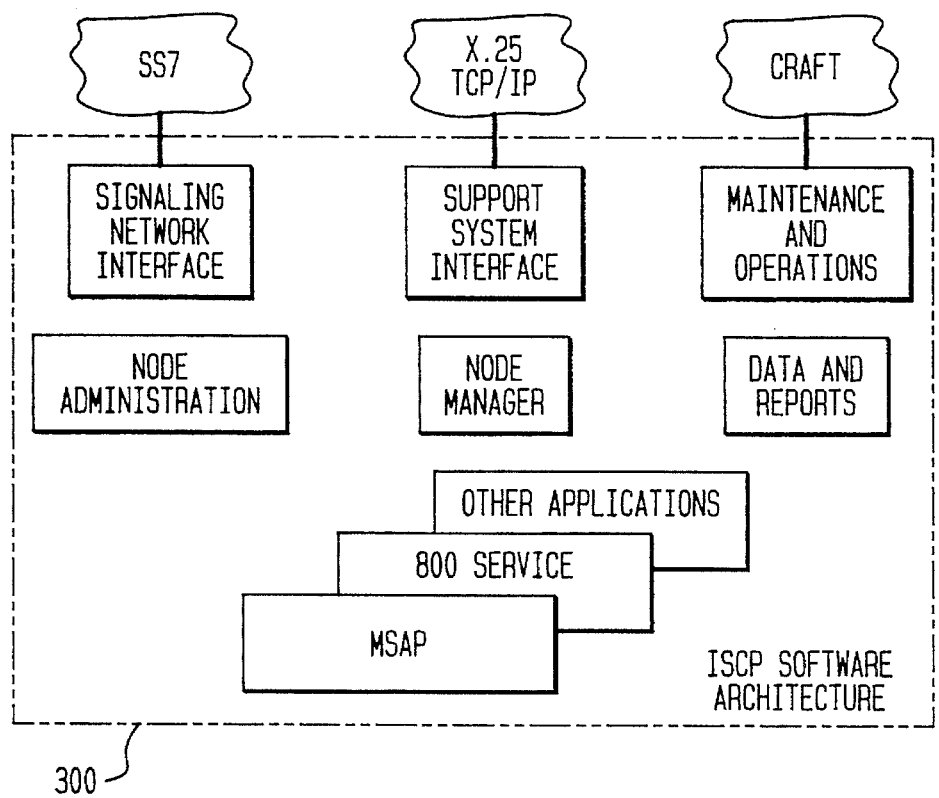
FIG. 6C illustrates the software architecture for the ISCP of FIG. 6B.
Figure 6F:
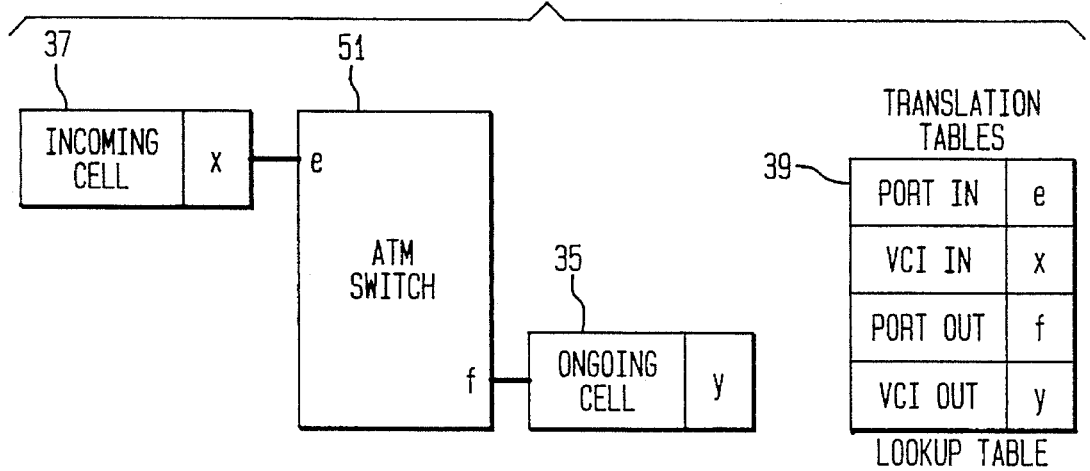
FIG. 6F illustrates a translation lookup table used by connection management to route cells based on port and VCI information.

FIG. 6F shows a lookup table 39 (only partially shown) employed by the connection management processor 64, populated by a command cell received by the ATM switch 51. The lookup table 39 defines the routing of incoming cell 37. In the illustrated case, incoming cell 37 at port e with label x is routed to port f and given label y to become the outgoing cell 35. To provide for two-way communication in the switched virtual connection, the SCP command cell also provides an instruction for cells to be sent from the called party to the calling party, i.e. Port f Label y to Port e Label x. The lookup table 39 is also populated with this instruction (not shown).

Figure 5A:
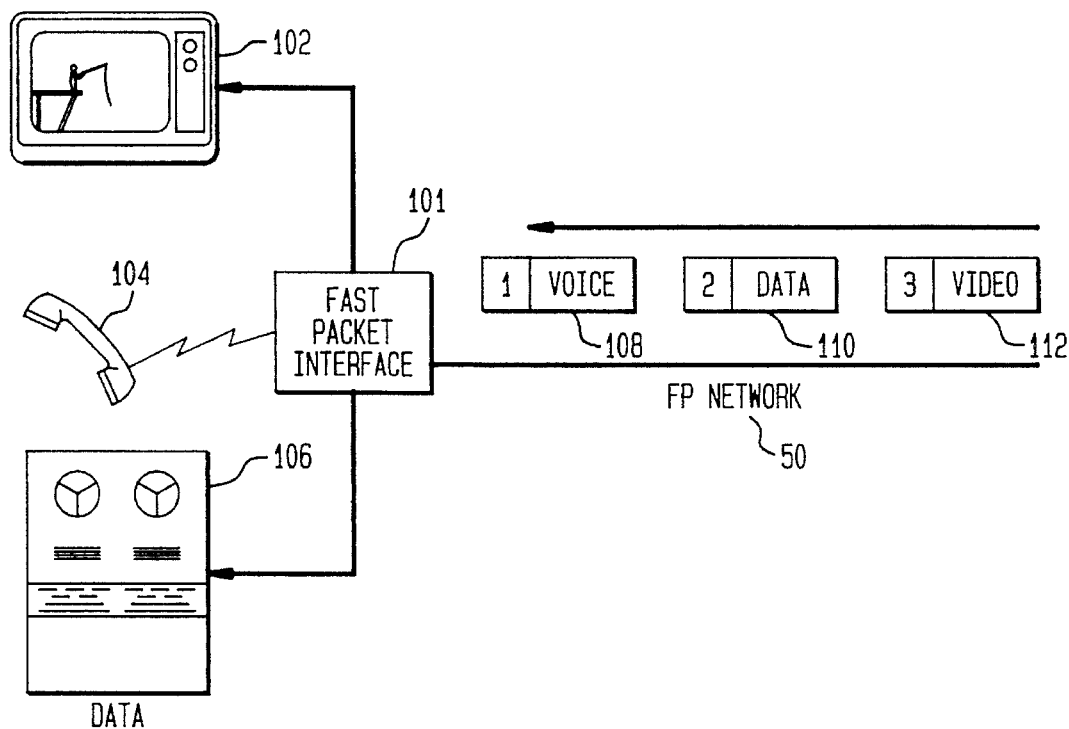
FIG. 5A illustrates an interface of customer video, voice, and data apparatus with the broadband intelligent network of FIG. 2A or 2B, in accordance with one embodiment of the present invention.
Figure 5B:
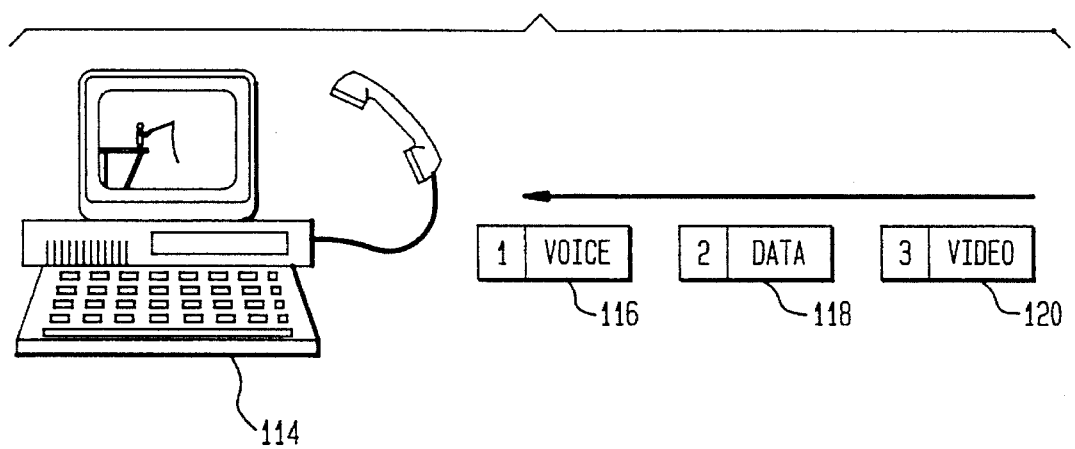
FIG. 5B illustrates an interface of customer multimedia apparatus with the broadband intelligent network of FIG. 2A or 2B, in accordance with one embodiment of the present invention.

As shown in FIG. 5A, customers subscribing to the BIN 50 can be equipped with multiple communication devices (customer premises equipment (CPE)), including video, voice, and data processing devices 102, 104, and 106, respectively, which may be simultaneously connected to the BIN 50 through a fast-packet interface 101. Packeted digital data transported to the CPE from the BIN 50 is schematically represented by cells 108, 110, and 112, respectively having voice, data, and video payloads. As shown in FIG. 5B, the customer may instead have a multimedia work station 114, which receives and transmits voice, data, and video cells 116, 118, and 120, respectively.

With reference again to FIG. 2A, a BIN SCP 61 is connected to a port 49 of the ATM switch 51, preferably through a direct fiber optic link 53. If the ATM switch 51 is handling OC-3 at 155 Mb/s, as shown, then the interface with the BIN SCP 61 is preferably at the same 155 Mb/s rate. Of course, a different rate could be used, if desired. Preferably, a backup BIN SCP 61B is connected to ATM switch port 49B through direct connector 53B to provide network controlled services with extremely high reliability. If the BIN SCP 61 fails, the BIN SCP 61B immediately takes over.

A preferred embodiment of the present invention uses "signaling cells" to establish switched virtual connections through the ATM switch 51. As used herein, a "signaling cell" may be a single cell or a sequence of cells. Preferably, a signaling cell has the same format as the ATM cells described above. In a preferred embodiment, the customer CPE is sufficiently intelligent to generate the signaling cells. Signaling cells request a particular service and contain the information in their payload necessary to complete a connection to another CPE, such as calling party address, called party address, billing information, digital bandwidth required, personal identification number (PIN), calling card number, etc. Signaling cells can be identified by unique values of the VPI and VCI or by a unique payload type code.

To establish a connection to a called party's CPE, a customer selects the desired type of service on his/her CPE. The CPE generates a signaling cell and sends it to the ATM switch 51. The ATM switch 51 routes the signaling cell to the BIN SCP 61. The BIN SCP 61 acts upon information contained in the signaling cell, generates translation information, and sends a command cell back to the connection management processor 64 and a signaling cell to the called party 54. In general, the BIN SCP 61 can communicate using signaling cells with either the calling party's CPE 52 or the called party's CPE 54. In a preferred implementation of the invention, a command cell carries the translation information generated by the BIN SCP 61 over the link 53 to the BIN-SCP port 49 of the ATM switch 51. The connection management processor 64 detects from the command cell header that the command cell is addressed to the processor 64 and, accordingly, receives it and acts on the information in it. Alternatively, a direct data link 55 connects the BIN SCP 61 to the ATM connection management processor 64 to convey network control commands for execution by the processor 64.

In response to the command cell, the connection management processor 64, under control of connection management software 30, populates a translation table with information necessary to establish the required virtual circuit in the ATM switch 51. Thereafter, communication cells generated by the connected parties are received by the ATM switch 51 and routed in accordance with the translation table.

The signaling cell header includes preassigned values of VPI and VCI that identify it as a signaling cell. When the BIN SCP 61 reads the signaling cell values of VPI and VCI, the BIN SCP 61 determines that a signaling cell has been received, reads the signaling cell payload, and generates the translation information after performing such functions as carrier identification, address translation, and billing validation. In effect, the signaling mechanism of the invention is a virtual signaling channel between each customer and the BIN SCP 61 since signaling cells can be transmitted through the virtual signaling channel on demand.

Call processing software 31 in the BIN SCP 61 is preferably used to support a wide variety of ATM network services. For example, for an ATM 800 service, the BIN SCP 61 uses the addresses of the calling and called parties and the bandwidth requested to determine where to route the call and to determine the carrier involved to complete the connection. If a call were being placed to a Dow Jones computer, the BIN SCP 61 could determine which particular computer to connect the caller to and which carrier to use as a function of the time of day, the day of week, and/or the location of the calling party. Another example is ATM ABSs where the BIN SCP 61 provides a billing authorization function based on the calling card number or credit card number of the calling party. The BIN SCP 61 can also be used to support ATM PVNs with closed user groups, originating screening, terminating screening, special dialing plans, etc. Further, the BIN SCP 61 can support many multimedia capabilities such as handling a mid-call handoff from one medium to another, e.g., switching from voice to video communications. An example of this capability is described below.

As described more fully below in connection with a second embodiment of the invention, the ATM switch 51 can be interfaced with a BIN integrated service control point (ISCP) 285. In this case, the SPACE™ system 283 can be used to allow rapid development of new ATM network services to support customization and to broaden the participation in service creation, implementation, and management.

When a connection is to be taken down or terminated, the calling party CPE sends a signaling cell to the BIN SCP 61, which subsequently commands the connection management processor 64 to terminate the call. The BIN SCP 61 records the time the call is set up, the time the call is taken down, the bandwidth used, any mid-call changes, etc., and transmits a billing record 65 to a conventional regional accounting office (RAO) 67.

The interface between the ATM switch 51 and the BIN SCP 61 uses ATM transport rates, e.g., 155 Mb/s. The BIN SCP 61 response time in the ATM BIN 50 is a few milliseconds or less as compared to the several hundred millisecond response time provided by an SCP or ISCP in the conventional IN and AIN circuit-switched networks.

Moreover, the BIN SCP 61 and the ATM connection management processor 64 preferably communicate directly through the connector 53 and the ATM switch port 49 (Path A) or through an ATM-rate data link in a separate interface (Path B). These are much faster CCSN connection routes compared to the connection routes in conventional IN and AIN circuit-switched networks.

Network service control for the BIN 50 may employ a software platform conceptually like that employed in a conventional SCP for circuit-switched networks, but the SCP is configured to function at the speeds needed for ATM (i.e. more than 100 times faster) and to interface with the ATM network structure as appropriate. Hence, circuitry for the BIN SCP 61 differs from circuitry 160 for a conventional SCP. Further, application programs for controlling network services from the BIN SCP 61 differ from corresponding application programs for a conventional SCP.

FIGURE 6A shows a conventional SCP 160 used in the circuit-switched network. A plurality of back-end central processing units 162 are provided with storage disks 164 and provide call handling information in response to network queries. The SCP back-end processors 162 are connected to front-end processors 166, which in turn are coupled to SSPs through SS7 links in the CCSN 136. A local area network, i.e. a 10 Mb/s Ethernet 168, interconnects the SCP processors 162 with the SS7 front-end processors 166 and supporting systems 170. The front-end processors provide SS7 protocol processing. The speed and protocol of the signaling network 136 and the SCP interfacing thereto make the prior art SCP unsatisfactory for application to fast-packet networks.

Figure 6D:
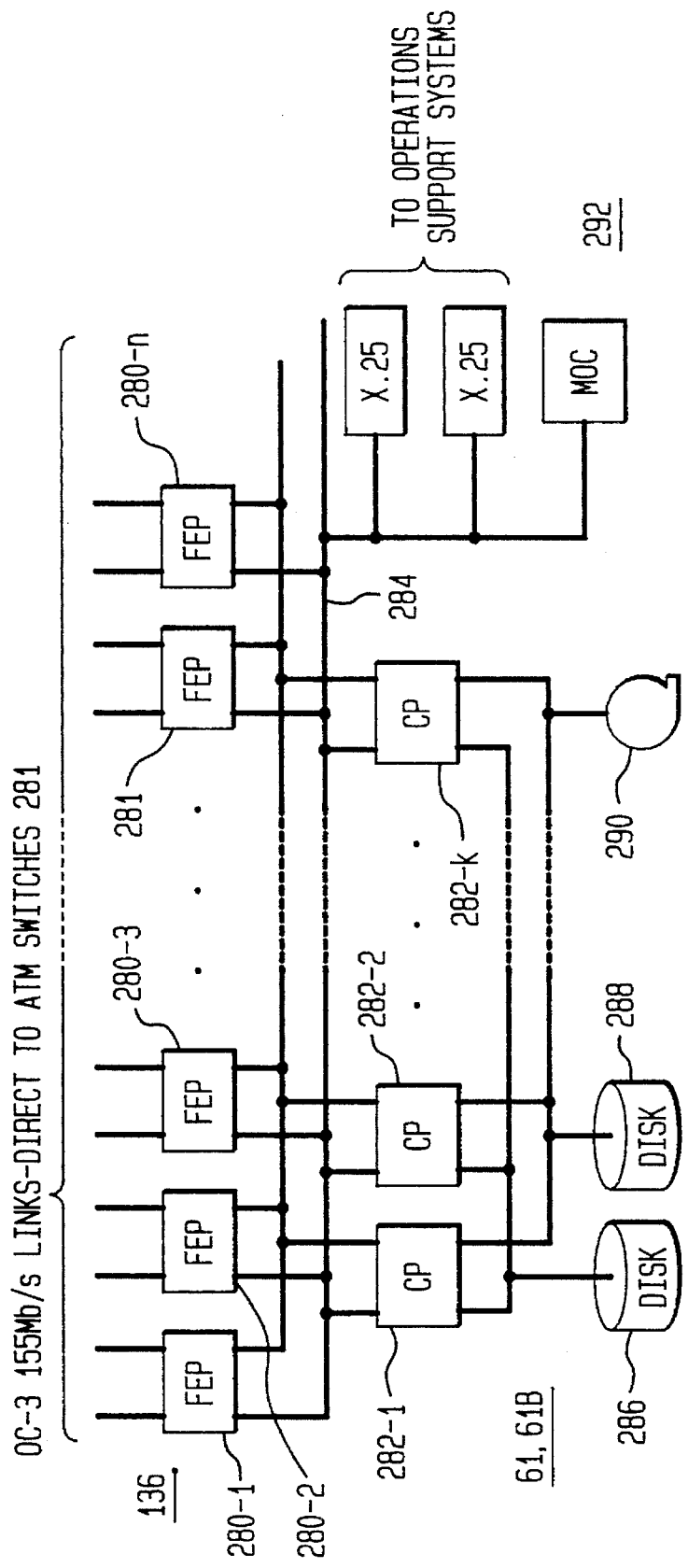
FIG. 6D is a schematic diagram of an SCP for a broadband intelligent network, in accordance with one embodiment of the present invention.

FIGURE 6D, on the other hand, shows a BIN SCP 61 of the present invention. A plurality of front-end processors 280-1 through 280-n are directly connected to one or more ATM switches 51 in the BIN 50 through OC-3 155 Mb/s links 281 (lower or higher speed ATM rates can also be used, e.g., the 45 Mb/s DS-3 rate or 622 Mb/s OC-12 rate). The front-end processors 280 can buffer an incoming 53-byte ATM cell in 2.7 microseconds for delivery to the back-end. They can also monitor the error performance of the 155 Mb/s ATM links (there are a variety of error monitoring schemes that can be used over a block of cells). Back-end processors 282-1 through 282-k are coupled to the front-end processors 280 through a local area network 284. The back-end processors 282 can access disks 286 and 288 and tape units 290, but preferably, the processor main memory is used to execute program procedures to develop responses to service request queries received from the ATM switch or switches over the OC-3 links 281.

The back-end processors 282 are coupled through an interface 284 to operations support systems similar to corresponding support system interfaces in the circuit-switched SCPs of the prior art.

Figure 7A:
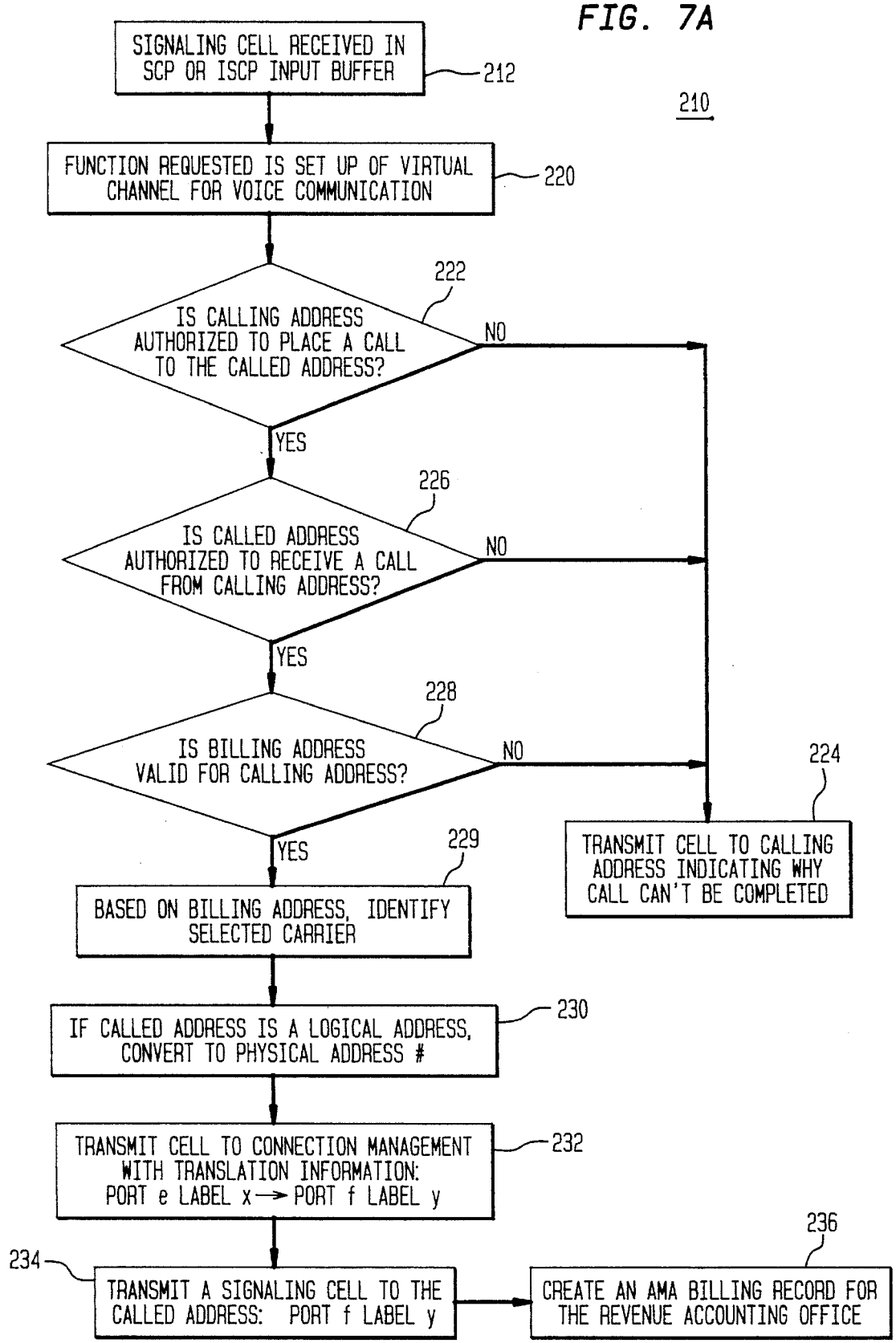
Figure 7B:
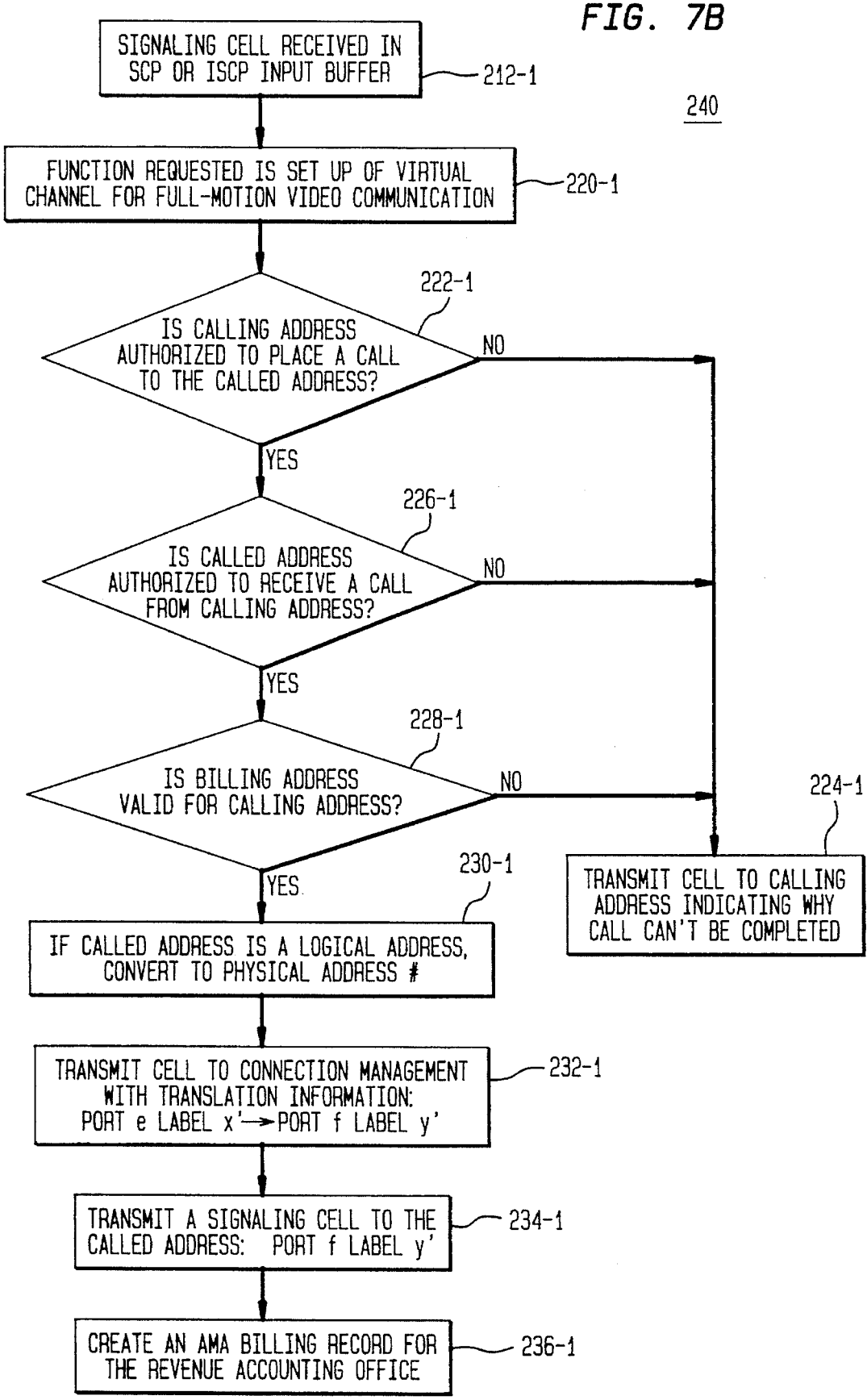
Figure 7E:
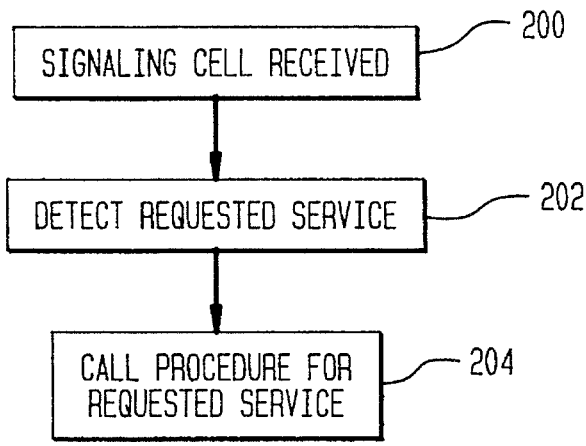
FIG. 7E is a flow diagram of procedures executed by an SCP in the networks of FIGS. 2A and 2B, in accordance with one embodiment of the present invention.

Programmed procedures for implementing network services in general, and call connection services in particular, are shown for the BIN SCP 61 (and for the BIN ISCP 285) in FIGS. 7A through 7E. As shown in FIG. 7E, a requested network service is detected in step 202 for a signaling cell received in a block 200. Step 204 then calls the stored program procedure corresponding to the requested service.

Figure 8:
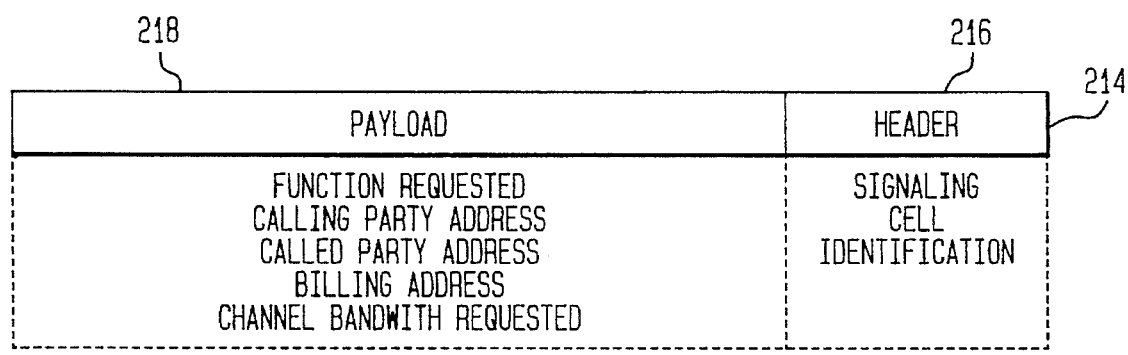
FIG. 8 is a diagram of a signaling cell, in accordance with one embodiment of the present invention.

FIGS. 7A through 7D show procedures used for call connection service for a multimedia call, i.e. procedures employed in establishing a connection, implementing, and terminating mid-call bandwidth changes, and terminating the connection. FIG. 8 is a diagrammatic representation of a signaling cell associated with the call connection procedures of FIGS. 7A through 7D.

A procedure 210 in FIG. 7A is called for execution to establish a requested switched virtual circuit for voice communication. Thus, step 212 receives information from a signaling cell 214 (FIG. 8) received in an input SCP buffer.

The cell 214 contains a header 216 having encoded information including an identification of the cell 214 as a signaling cell by a preassigned value of VPI and VCI or by payload type. The cell 214 further contains a payload 218 carrying information including: function requested, calling party address, called party address, billing address, and channel bandwidth requested.

In the procedure 210, step 220 next identifies a request for a virtual channel for voice communications. Originating screening is then performed in step 222 by checking whether the calling address is authorized to place a call to the called address. If not, a signaling cell is transmitted by step 224 to the calling address indicating why the call cannot be completed.

If originating authorization is determined, terminating screening is next performed in step 226 by checking whether the called address is authorized to receive a call from the calling address. Step 224 transmits a notification cell if the call is not authorized to be received.

If the call connection is authorized, billing authorization is checked by step 228. Again, a notification cell is sent to the calling party by the step 224 if billing is unauthorized. Next, step 229 checks stored customer data to determine the designated carrier to handle the call if required to establish the connection, and an appropriate output command is generated.

For calls authorized for connection and billing, step 230 translates the called address to a physical address if the called address is a logical address. Otherwise, no action is taken. When translation occurs, the translation may be a function of the time of day, the day of week, the called address, and other possible parameters.

Next, step 232 populates the switch translation table 39 (FIG. 6F) in the ATM switch connection management processor 64. Thus, step 232 transmits a command cell to the connection management processor 64 with translation information, e.g., Port e, Label x to Port f, Label y.

Step 234 next signals the called party by transmitting a signaling cell to the called address, Port f, Label y. Finally, a billing record is created in step 236 from the known calling, called and billing addresses, time, carrier, and bandwidth information. The billing record may be sent immediately to the RAO 67 or it may be held until an accumulated record for the session is obtained for transmission.

A procedure 240 in FIG. 7B is provided for responding to a mid-call request for the addition of a virtual channel for full-motion video communication to the existing connection.

For example, a called medical doctor may determine during a voice communication that it is desirable to see a video record of a patient that is accessible to the calling party.

In this case, the signaling cell 214 is again used, but a channel add function with a bandwidth for video is requested. The steps for the procedures 210 and 240 are similar, and like reference characters have been employed for corresponding steps, with -1 added to the steps of the procedure 240.

In step 220-1, the requested function is determined to be a set up of a virtual channel for full-motion video communication. Step 232-1 transmits a command cell to the ATM switch for a video channel to be added to the existing connection. Step 234-1 transmits a signaling cell to the called address for the virtual video channel.

In FIG. 7C, a procedure 250 is provided for a mid-call request to terminate the established full-motion video channel. Accordingly, a signaling cell 214 identifies the function requested as a termination of the video channel. Step 252 detects the signaling cell information, and step 254 identifies the requested service as a termination request for the video channel.

Step 256 provides for removing the entry Port e, Label x from the ATM switch translation table by transmitting a command cell to the ATM switch processor. The called party is signaled by a signaling cell generated by step 258 to the effect that the video channel is terminated. Step 260 creates a billing record on the basis of the termination time and the channel terminated.

A procedure 270 employs steps similar to the steps of the procedure 250 and accordingly the steps have been assigned like reference characters with the addition of "-1." In step 254-1, the requested service is determined to be a termination of the existing virtual voice channel. Steps 256-1 and 258-1, respectively, direct the removal of the table entry for a voice channel and signal the called party regarding the termination of the voice channel. A billing record created in step 260-1 is based on the termination time and the channel terminated.

Figure 7F:
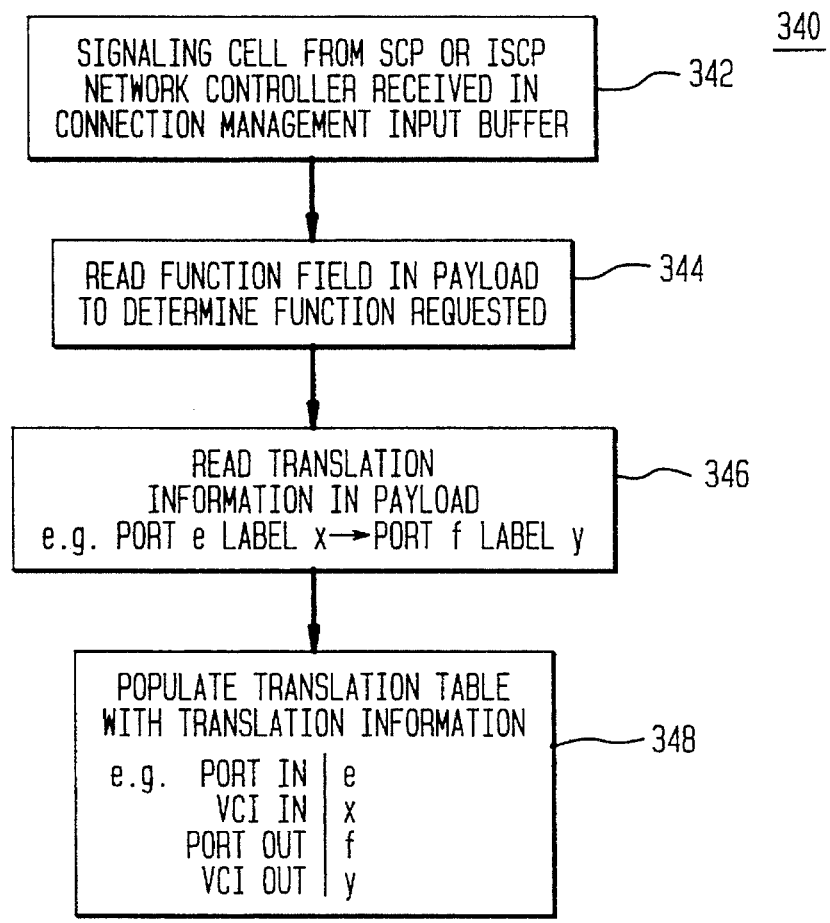
FIG. 7F is a flow diagram of procedures executed by an ATM switch to establish a switched virtual connection in response to a service control command in the networks of FIGS. 2A and 2B, in accordance with one embodiment of the present invention.

In FIG. 7F, a procedure 340 is provided in the previously noted connection management software of the processor 64 to implement SCP commands received from command cells, as preferred, or by data link 55. In step 342, the command signaling cell data is received in an input buffer. Next, in step 344, a function field is read in the cell payload to determine the requested function.

Step 346 then reads translation information from the payload, e.g., Port e Label x Port f Label y. Finally, step 348 populates the translation table 39 (FIG. 6F) as shown.

As discussed, a second embodiment of the invention employs an ISCP, as shown in FIG. 2B. In accordance with the invention, a broadband AIN (BAIN) 280 is substantially similar to the BIN 50 of FIG. 2A, except that a BIN ISCP 285 and a backup BIN ISCP 285B are employed in place of the BIN SCPs 61 and 61B and SPACE™ system 283 is coupled to the BIN ISCP 285 and/or 285B. Like reference characters are accordingly employed for like elements in the two networks. Program procedures executed in the BIN SCP 61 can be executed in the BIN ISCP 285. The ISCP 285 or 285B and the SPACE™ system 283 together provide for service creation, implementation, execution, and management functions.

The SPACE™ system 283 enables network services to be programmed automatically into the BIN ISCPs 285 and 285B under an operator's direction. The following copending applications assigned to the present assignee relate to the SPACE™ system, as well as the structure and operation of ISCPs, and are hereby incorporated by reference: 1) U.S. patent application Ser. No. 07/629,371, entitled "Systems and Processes Providing Programmable or Customized Customer Telephone Information Services," by Ely et al., filed Dec. 18, 1990; 2) U.S. patent application Ser. No. 07/972,817, entitled "A Method of Creating a Telecommunication Service Specification" by Man et al., filed Nov. 6, 1992; and 3) U.S. patent application Se. No. 07/934,240, entitled "System and Method for Creating, Transferring, and Monitoring Services in a Telecommunication System," by Nazif et al, filed Aug. 25, 1992.

The BIN ISCP 285 or 285B interfaces directly with the ATM switch 51 and provides network control in the manner described for the BIN SCP 61 or 61B. Thus, command cells are generated by the BIN ISCP 285 or 285B and transmitted through the switch port 49 or 49B, thereby populating translation lookup table 39. Switched virtual connections are thus established and terminated for voice, data, and video communication cells as previously described. Command data may alternatively be transmitted through the link 55 as described above. In addition, the BIN ISCP 285 can communicate using signaling cells with either the calling party's CPE 52 or called party's CPE 54.

Like SCPs, ISCPs, with their service network interfaces, are unsuitable for application to a fast-packet network. A conventional ISCP 290 (FIGS. 6B and 6C) has a hardware and software architecture similar to that of the conventional SCP 160 of FIG. 6A. Thus, back-end processors 292-1, 292-2, and 292-3, employ storage disks 294 and shared disks 296, and are programmed to perform call processing in accordance with various procedures designed to implement circuit-switched network services. Front-end processors 298-1 through 298-6 provide port master processing for signals interfaced to the SS7 signaling networks 136 through an SS7 link.

Figure 1A:
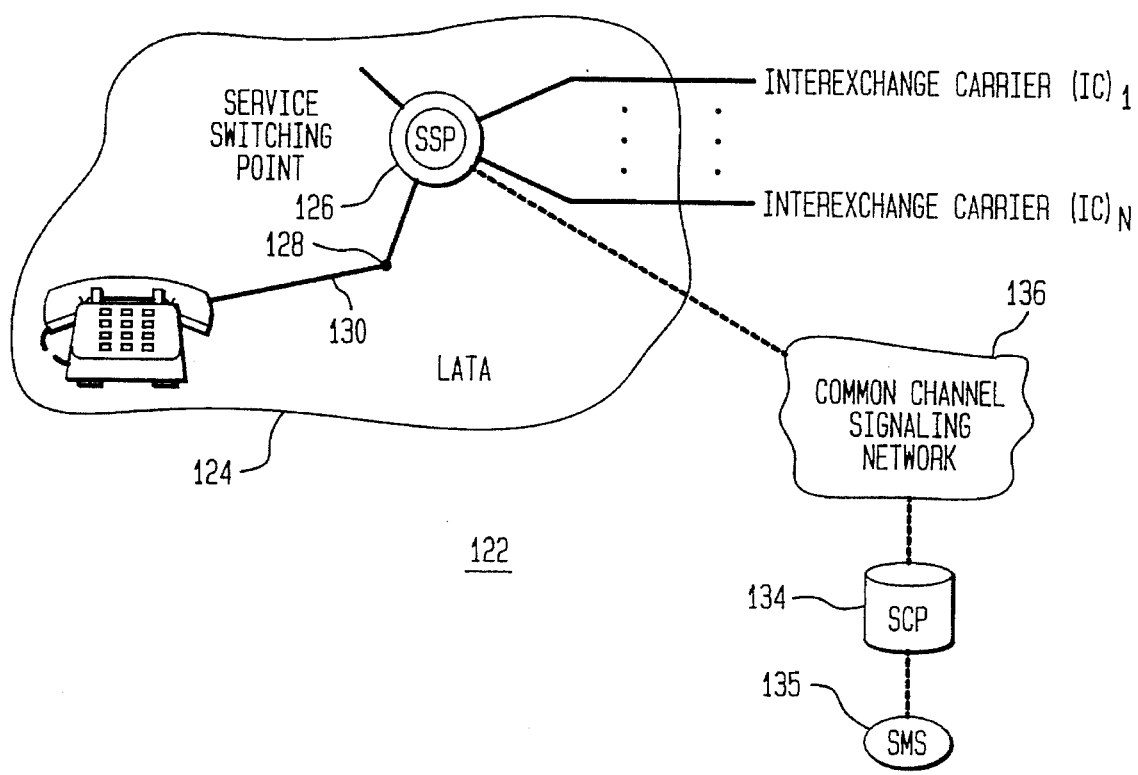
Figure 1B:
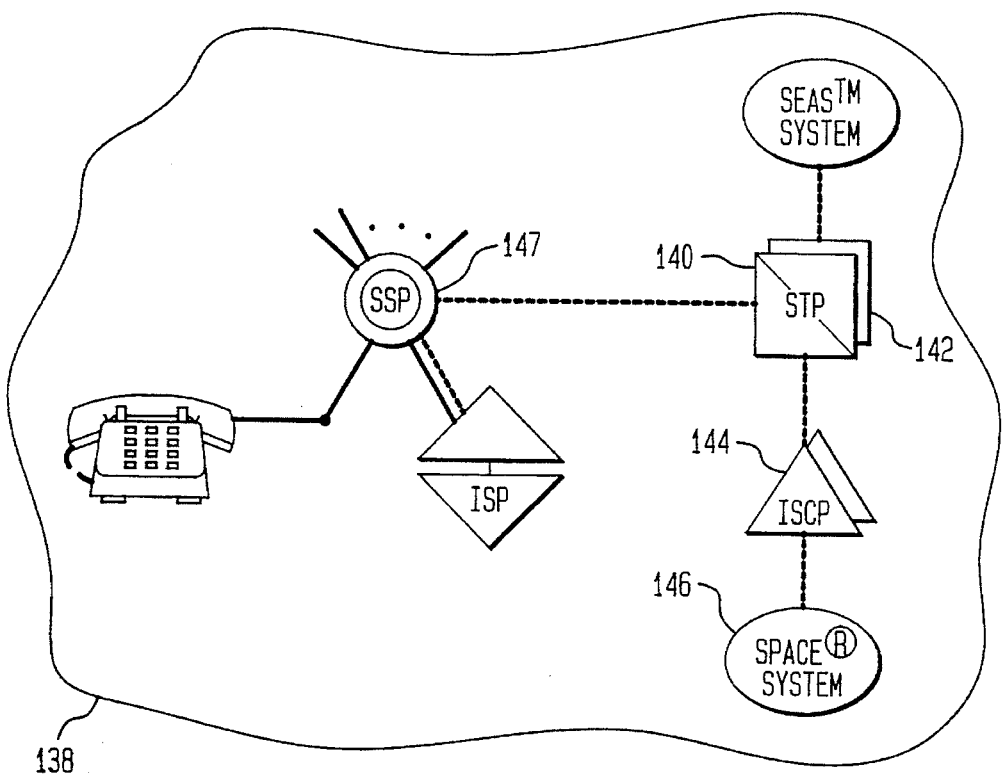
FIG. 1B is a block diagram of a conventional circuit-switched AIN.
Figure 6E:
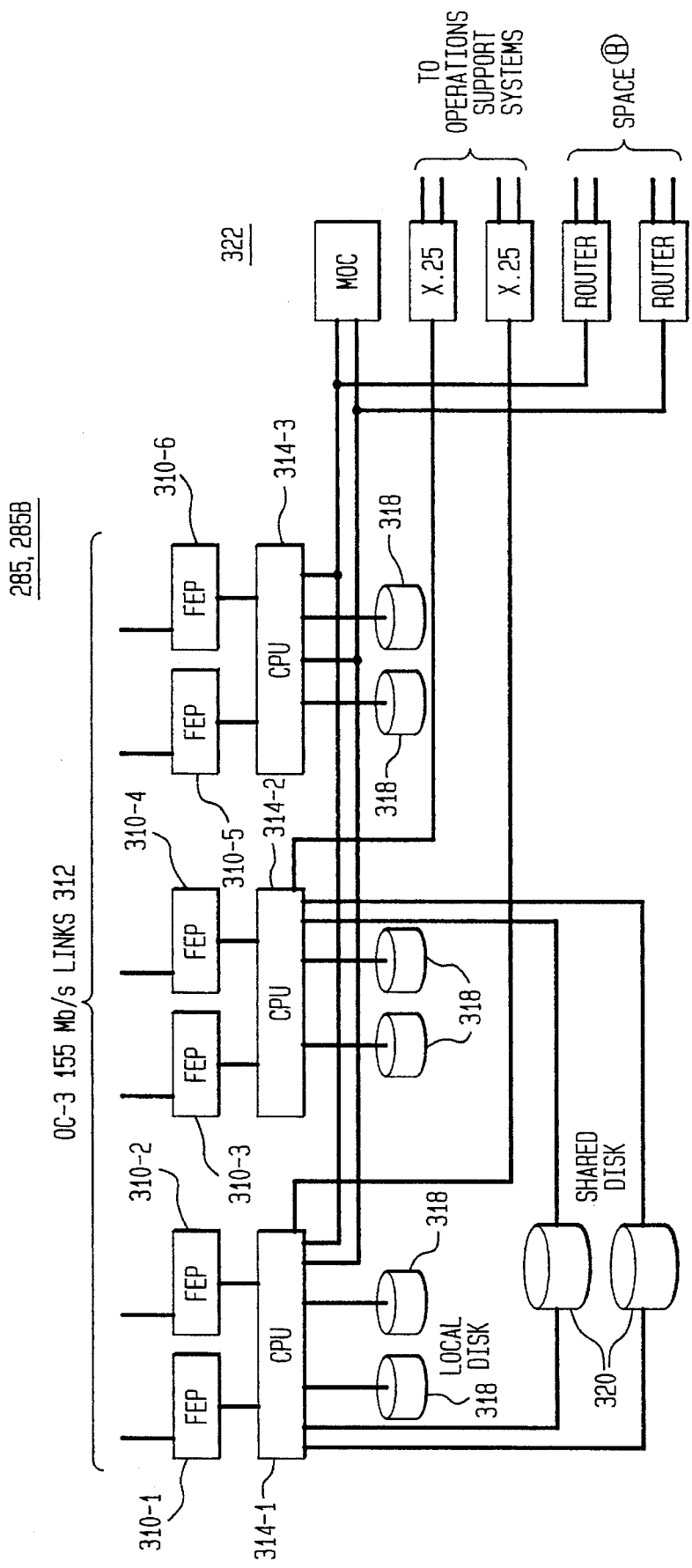
FIG. 6E is a schematic diagram of an ISCP for a broadband intelligent network, in accordance with one embodiment of the present invention.

As shown in FIG. 6E, a plurality of front-end processors 310-1 through 310-6 are directly connected to one or more ATM switches in the BAIN 280 through OC-3 155 Mb/s links 312. Back-end processor 314-1, 314-2, and 314-3 are coupled to the front-end processors through a high speed interconnect. However, the processor main memory is used to execute program procedures to develop responses to service request queries. Local and shared storage disks 318 and 320 are employed by the back-end processors 314-1, 314-2, and 314-3. An interface 322 couples various support systems including the SPACE™ system to the ISCP 285 or 285B. As previously indicated, call processing procedures similar to those employed in the BIN SCP 61 of FIG. 1A may be loaded and executed in the BAIN ISCP 285 OR 285B.

Software architecture illustrated in dotted box 300 is employed for the prior art ISCP 290. Various interface and software functions are designated in respective blocks in the dotted box 300.

To illustrate the operation of the invention, a network response to a customer connection service request will now be described for FIG. 2A. Assume, for example, that a caller initially requests a voice channel. When the caller enters a connection service request, as described above, the CPE generates a signaling cell with a payload having service request data including the function requested, the calling, called, and billed parties' addresses and the desired bandwidth.

The signaling cell is transmitted to the ATM switch 51. ATM switch 51 identifies the cell as a signaling cell from its header information and routes the signaling cell to the BIN SCP 61.

The BIN SCP 61 reads the cell payload to determine the requested service, executes call processing software, and generates a command cell. The BIN SCP 61 then transmits the command cell to ATM switch 51 through port 49 and transmits a signaling cell to the called party's CPE 54. The connection management processor 64 populates the translation table 39 in accordance with the command cell information to establish a switched virtual connection between the known input port and the defined output port. Thereafter, cells representing voice communication are automatically routed between these two ports.

One of the parties, such as the calling party, may then request a channel with a broader bandwidth for, for example, full-motion video. The calling party's CPE generates a corresponding signaling cell and sends it to the ATM switch 51. ATM switch 51 routes this signaling cell to the SCP 61. In response, SCP 61 generates a command cell and sends it to the ATM switch 51 and transmits a signaling cell to the called party's CPE 54. Connection management processor 64 modifies the translation table by adding a switched virtual channel for video to the existing switched virtual connection path for voice. Cells carrying video information are thereafter transmitted through the added virtual "video" channel. If desired, either party may add a data channel to the virtual connection path in a similar manner.

Termination of switched virtual channel and path connections is executed in a manner similar to that described for establishing these connections. Thus, a termination signaling cell is generated for each termination and it is sent to the SCP 61. The SCP 61 transmits the signaling cell to the ATM switch 51 to command a removal of the channel or path and, in addition, signals the called party's CPE 54 that the call has been terminated.

As a result of the operation of the invention as just illustratively described, communication can be conveniently and economically established to enable communication by voice, data, or video or simultaneous communication through any combination of these or other media.

The foregoing description of the preferred embodiment has been presented to illustrate the invention without intent to be exhaustive or to limit the invention to the form disclosed. In applying the invention, modifications and variations can be made by those skilled in the pertaining art without departing from the scope and spirit of the invention. It is intended that the scope of the invention be defined by the claims appended hereto, and their equivalents.

APPENDIX A

The following are commonly accepted definitions of terms used in describing ATM systems and ATM cell information:

CPE—Customer Premises Equipment—customer owned equipment used to terminate or process information from the public network, e.g., terminal equipment or a multiplexer or a PBX.

NNI—Network-Node Interface—the interface between two public network pieces of equipment.

PVC—Permanent Virtual Channel (or Circuit)—a channel through an ATM network provisioned by a carrier between two end points, used for dedicated long term information transport between locations.

SVC—Switched Virtual Channel (or Circuit)—a channel established on demand by network signaling used for information transport between two locations, lasting only for the duration of the transfer; the datacom equivalent of a dialed phone call.

UNI—User-Network Interface—the physical and electrical demarcation point between the user and the public network service provider.

VC—Virtual Channel—a communications path between two nodes identified by label rather than fixed physical path.

VCI—Virtual Channel Identifier—the address or label of a virtual channel.

VP—Virtual Path—a collection of VCs all traveling between common points.

VPI—Virtual Path Identifier—The address of a virtual path.

I claim:

1. A broadband intelligent network comprising:

a fast-packet switch having a plurality of ports;

a switch processor for managing virtual connections among the switch ports to establish switched virtual connections for routing of cells, in accordance with connection request data contained in a signaling cell sent by a calling party for each request for a connection between the calling party and a called party;

respective customer links having a relatively broad digital bandwidth connected to predetermined switch ports for transporting the cells to and from customer apparatus;

a network control processing system, interfaced to at least one of the switch ports, to receive signaling cells carrying customer service request data and to control network responses thereto;

the switch processor detecting each signaling cell received by the switch and routing each signaling cell to the network control processing system through the at least one switch port;

the network control processing system detecting the service request data in each received signaling cell and generating at least one output command for implementing requested service; and the network control processing system sending at least one signaling cell to the calling party or the called party in implementing the requested service.

2. The broadband intelligent network of claim 1 wherein the network control processing system is interfaced to the one switch port through a substantially direct connection having a relatively broad digital bandwidth.

3. The broadband intelligent network of claim 1 wherein the interface from the network control processing system to the one switch port is structured to provide the interface with a transport rate at least substantially equal to a fast-packet transport rate in the network.

4. The broadband intelligent network of claim 1 wherein at least some of the output commands are output as command cells carrying service execution data and being transmitted to the switch through the one port for implementation.

5. The broadband intelligent network of claim 1 wherein a data link is provided for coupling to the switch processor those output commands that are to be executed by the switch processor.

6. The broadband intelligent network of claim 1 wherein the input data cells are data cells being transported between calling and called parties.

7. The broadband intelligent network of claim 3 wherein the customer connection lines and the direct connection are provided with use of at least some fiber optic facilities.

8. The broadband intelligent network of claim 1 wherein at least a second fast-packet switch having additional ports is provided in the network and the network control processing system is further interfaced to at least one of the additional ports of the second fast-packet switch to receive signaling cells carrying customer service request data and to control network responses thereto.

9. The broadband intelligent network of claim 1 wherein a backup network control processing system is interfaced to at least another of the switch ports to receive the signaling cells carrying customer service request data and to control network responses thereto if the network control processing system fails and transfers control to the backup network control processing system.

10. The broadband intelligent network of claim 1 wherein the network control processing system includes a system for creating network procedures that implement requested new network services when executed by the network control processing system in response to data requests from signaling cells for the execution of such services.

11. The broadband intelligent network of claim 10 wherein the network control processing system is interfaced to the one switch port through a substantially direct connection having a relatively broad digital bandwidth.

12. The broadband intelligent network of claim 10 wherein the interface from the network control processing system to the one switch port is structured to provide the interface with a transport rate at least substantially equal to a fast-packet transport rate in the network.

13. The broadband intelligent network of claim 10 wherein the network control processing system outputs at least some of the output commands as command cells carrying service execution data for transmission to the switch through the one port for implementation.

14. The broadband intelligent network of claim 10 wherein at least a second fast-packet switch having additional ports is provided in the network and the network control processing system is further interfaced to at least one of the additional ports of the second fast-packet switch to receive signaling cells carrying customer service request data and to control network responses thereto.

15. The broadband intelligent network of claim 1 wherein the network control processing system detects a service request for a call connection from the service request data.

16. The broadband intelligent network of claim 15 wherein the network control processing system employs stored data to check the requested call connection for calling and called party authorizations, requested billing party authorization, carrier identification, and any required address translation, and generates a connection output command to provide a virtual connection between calling and called parties if the checked authorizations are obtained.

17. The broadband intelligent network of claim 15 wherein signaling cells for establishing a virtual connection path with a requested first bandwidth and for terminating the virtual connection path are successively received by the network control processing system and successive output commands are generated by the network control processing system in response thereto to establish the requested virtual connection path and subsequently to terminate the requested virtual connection path.

18. The broadband intelligent network of claim 17 wherein a mid-call signaling cell is received for an additional virtual channel in the connection path with another bandwidth different from the first bandwidth and another output command is generated in response to the mid-call signaling cell by the network control processing system to establish the requested virtual channel.

19. The broadband intelligent network of claim 18 wherein another mid-call signaling cell is received to terminate the virtual channel and still another output command is generated by the network control processing system in response to the other mid-call signaling cell to terminate the established virtual channel.

20. The broadband intelligent network of claim 19 wherein all of the output commands are output as command cells carrying service execution data and being transmitted through the one port to the switch processor for execution.

21. The broadband intelligent network of claim 18 wherein the first bandwidth is a bandwidth for voice and the other bandwidth is a bandwidth for broadband digital data or video transmission.

22. The broadband intelligent network of claim 15 wherein the network control processing system makes a billing record for each requested connection by recording signaling cell data including calling and called parties, billed party, times of connection path establishment and termination, connection path bandwidth, and times of establishment and termination of any channel having a bandwidth different from the connection path, and the network control processing system generating a billing record output for customer billing purposes.

23. The broadband intelligent network of claim 1 wherein the network control processing system employs stored customer data to identify and select a carrier for call connection requests detected from the customer service request data.

24. The broadband intelligent network of claim 23 wherein the network control processing system further employs customer store data to determine a carrier based on a billing party address and generates an output command corresponding thereto.

25. The broadband intelligent network of claim 1 wherein the network control processing system employs stored data to provide carrier identification, address translation, and predetermined authorization(s) for service requests detected from the customer service request data.

26. The broadband intelligent network of claim 1 wherein:
the customer apparatus generates signaling cells with a header portion and a payload portion;
the header portion having data identifying the cell as a signaling cell;
the payload portion having data defining a network service request;
the network control processing system detects signaling cells by reading the signaling cell header data; and
the network control processing system reads the payload data of detected signaling cells to determine service requests whereby a virtual signaling channel is provided between each customer and the network control processing system.

27. A broadband intelligent network comprising:
means for fast-packet switching among a plurality of ports;
first means for processing label information from cells to route cells and to manage virtual connections between the ports to establish switched virtual connections that perform data cell routing in accordance with connection request data contained in a signaling cell sent for each request for a connection between a calling party and a called party;
means for coupling customer apparatus through connections having a relatively broad digital bandwidth to predetermined switch ports to transport cells to and from the customer apparatus;

second means for processing customer service request data detected from received signaling cells and to control network responses thereto;

means for interfacing the second network control processing means to at least one of the switch ports;

the first processing means detecting each signaling cell received by the fast-packet switch means and routing each signaling cell to the second processing means through the one switch port;

the second processing means detecting service request data in each received signaling cell and generating at least one output command to implement the requested service; and the second processing means sending at least one signaling cell to the calling party or the called party.

28. The broadband intelligent network of claim 27 wherein the interfacing means provides a substantially direct connection having a relatively broad bandwidth.

29. The broadband intelligent network of claim 27 wherein the interface means is structured to provide the interface with a transport rate at least substantially equal to a fast-packet transport rate in the network.

30. The broadband intelligent network of claim 27 wherein at least some of the output commands are output as command cells carrying service execution data and being transmitted to the fast-packet switching means through the one port for implementation.

31. The broadband intelligent network of claim 28 wherein at least some of the output commands are output as command cells carrying service execution data and being transmitted to the switching means through the one port for implementation.

32. The broadband intelligent network of claim 31 wherein at least a second means for fast-packet switching having additional ports is provided in the network and the second network control processing means is further interfaced to at least one of the additional ports of the second fast-packet switching means to receive other signaling cells therefrom carrying customer service request data and to control network responses thereto.

33. The broadband intelligent network of claim 27 wherein:

at least a second means for fast-packet switching having additional ports is provided in the network and the second processing means is further interfaced to at least one of the additional ports of the second fast-packet switching means to receive other signaling cells carrying customer service request data and to control network responses thereto; and means are provided for backup network control processing, the backup processing means interfaced to at least another of the switch ports to receive the signaling cells carrying customer service request data and to second control network responses thereto if the second network control processing means fails and transfers control to the backup processing means.

34. The broadband intelligent network of claim 27 wherein the second network control processing means includes means for creating network procedures that implement requested new network services when executed by the second processing means in response to data requests for the execution of such services.

35. The broadband intelligent network of claim 34 wherein the second processing means is interfaced to the one switch port through a substantially direct connection having a relatively broad digital bandwidth and providing transport rate at least substantially equal to a fast-packet transport rate in the network; and the second processing means outputs at least some of the output commands as command cells carrying service execution data for transmission to the switch for implementation.

36. The broadband intelligent network of claim 34 wherein the customer connection lines and the direct connection are provided with the use of at least some fiber optic facilities.

37. The broadband intelligent network of claim 35 wherein at least a second means for fast-packet switching having additional ports is provided in the network and the second network control processing means is further interfaced to at least one of the additional ports of the second fast switching means to receive other signaling cells therefrom carrying customer service request data and to control network responses thereto; and means are provided for backup network control processing, the backup processing means interfaced to at least another of the switch ports to receive the signaling cells carrying customer service request data and to control network responses thereto if the second processing means fails and transfers control to the backup control processing means.

38. The broadband intelligent network of claim 27 wherein the second processing means detects a service request for a call connection from the service request data;

the second processing means employs stored data to check the requested call connection for calling and called party authorizations and requested billing party authorization, for carrier identification and for any required address translation and generates a connection output command to connect calling and called parties if the checked authorizations are obtained;

signaling cells for establishing a virtual connection path with a requested first bandwidth and for terminating the connection path are successively received by the second processing means and successive output commands are generated by the second processing means to establish the requested connection path and subsequently to terminate the requested connection path; and the second processing means generating the output commands as command cells carrying service execution data and being transmitted through the one port to the fast switching means for execution.

39. The broadband intelligent network of claim 38 wherein a mid-call signaling cell is received for a channel in the connection path with another bandwidth different from the first bandwidth and another output command is generated by the second processing means to establish the requested channel; and another mid-call signaling cell is received to terminate the channel and still another output command is generated by the second processing means to terminate the requested channel.

40. The broadband intelligent network of claim 27 wherein the second processing means detects service request for a call connection from the service request data; and the second processing means makes a billing record for each requested connection by recording signaling cell data including calling and called parties, billed party, times of virtual channel establishment and termination, connection path bandwidth, and times of establishment and termination of other virtual channels having different bandwidth, and the second processing means generating a billing record output for customer billing purposes.

41. A method for operating a broadband intelligent network, the steps of the method comprising:

transporting cells between predetermined ports of a fast-packet switch and customer apparatus;

using a switch processor to manage virtual connections among the switch ports, so as to establish switched virtual connections for routing of cells in accordance with data provided in an input signaling cell from a calling party for each connection request;

processing customer service request data detected by a service control point processor from signaling cells received in the service control point processor through an interface with one of the switch ports to control network responses to the service request data;

operating the switch processor to detect each signaling cell received by the fast-packet switch and routing each signaling cell to the service control point processor through the one switch port; and the customer service request processing step including operating the service control point processor to detect service request data in each received signaling cell and generate at least one output command to implement the requested service.

42. The method of claim 41 wherein the steps further include:

operating the service control point processor to the one switch port through a substantially direct interface connection having a relatively broad digital bandwidth.

43. The method of claim 42 wherein the interface from the service control point processor to the one switch port operates at a transport rate at least substantially equal to a fast-packet transport rate in the network.

44. The method of claim 43 wherein the steps further include:

operating the service control point processor to generate at least some of the output commands as command cells carrying service execution data for transmission to the switch through the one port for implementation.

45. The method of claim 44 wherein the steps further include:

operating at least a second fast-packet switch having additional ports to provide switched virtual connections for input cells, and operating the service control point processor to interface at least one of the additional ports of the second fast-packet switch to receive signaling cells carrying customer service request data and to control network responses thereto.

46. The method of claim 43 wherein the steps further include:

operating a system to program the service control point processor with network procedures that create requested new network services for execution by the service control point processor when data requests are made therefor.

47. The method of claim 43 wherein the steps further include:

operating the service control point processor to detect a service request for a call connection from the service request data; and operating the service control point processor to make a billing record for each requested connection by signaling cell data including recording calling and called parties, billed party, times of connection path establishment and termination, connection path bandwidth, and times of establishment and termination of additional channels having different bandwidth, and the control processing system generating a billing record output for customer billing purposes.

48. The method of claim 43 wherein the steps further include:

operating the service control point processor to detect a service request for a call connection from the service request data;

operating the service control point processor to do carrier identification, to perform any required address translation, and to generate a connection output command to connect calling and called parties if calling and called party authorizations and requested billing party authorization are obtained for the connection; and operating the service control point processor to respond to successive signaling cells for establishing a connection path with a requested first bandwidth and for terminating the connection path and to generate in response thereto successive output commands to establish the requested connection path and subsequently to terminate the requested connection path.

49. The method of claim 46 wherein the steps further include:

operating the service control point processor to detect a service request for a call connection from the service request data; and operating the service control point processor to respond to successive signaling cells for establishing a connection path with a requested first bandwidth and for terminating the connection path and to generate in response thereto successive output commands to establish the requested connection path and subsequently to terminate the requested connection path.

50. A broadband intelligent network comprising:

a fast-packet switch having a plurality of ports;

a switch processor for managing virtual connections among the switch ports to establish switched virtual connections for routing cells, in accordance with connection request data contained in a signaling cell sent by a calling party for each request for a connection between a calling party and a called party;

respective customer links having a relatively broad digital bandwidth connected to predetermined switch ports for transporting the cells to end from customer apparatus;

a network control processing system interfaced to at least one of the switch ports to receive signaling cells carrying customer service request data and to control network responses thereto;

the switch processor detecting each signaling cell received by the switch end routing each signaling cell to the network control processing system through at least the one switch port; and the network control processing system detecting service request data in each received signaling cell and generating at least one output command for implementing the requested service.

* * * * *